(12) United States Patent  (10) Patent No.: US 12,332,141 B2
Inoue et al.  (45) Date of Patent: Jun. 17, 2025

(54) ESTIMATION SYSTEM, ESTIMATION METHOD, AND RECORDING MEDIUM

(71) Applicant: TDK CORPORATION, Tokyo (JP)

(72) Inventors: Yosuke Inoue, Tokyo (JP); Yuka Enda, Tokyo (JP); Naotsugu Ueda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 282 days.

(21) Appl. No.: 17/988,345

(22) Filed: Nov. 16, 2022

(65) Prior Publication Data

US 2023/0152186 A1  May 18, 2023

(30) Foreign Application Priority Data

Nov. 18, 2021  (JP) ................................ 2021-187948

(51) Int. Cl.
| | |
|---|---|
| *G01M 17/02* | (2006.01) |
| *B60C 23/04* | (2006.01) |
| *B60C 23/06* | (2006.01) |
| *B60W 40/13* | (2012.01) |
| *G01L 1/16* | (2006.01) |
| *G01M 17/013* | (2006.01) |

(52) U.S. Cl.
CPC ............. *G01M 17/02* (2013.01); *B60C 23/04* (2013.01); *B60C 23/0428* (2013.01); *B60C 23/064* (2013.01); *B60W 40/13* (2013.01); *G01L 1/16* (2013.01); *G01M 17/013* (2013.01); *B60W 2422/70* (2013.01)

(58) Field of Classification Search
CPC ..... G01M 17/02; G01M 17/013; B60C 23/04; B60C 23/0428; B60C 23/064; B60W 40/13; B60W 2422/70; G01L 1/16
See application file for complete search history.

(56) References Cited

U.S. PATENT DOCUMENTS

| | | | |
|---|---|---|---|
| 5,561,244 A | 10/1996 | Olesky et al. | |
| 6,339,956 B1 * | 1/2002 | Huinink | G01L 1/165 340/447 |

(Continued)

FOREIGN PATENT DOCUMENTS

| | | |
|---|---|---|
| JP | 08-247745 A | 9/1996 |
| JP | 2019-049488 A | 3/2019 |

(Continued)

OTHER PUBLICATIONS

KR-20090131378-A, English Translation (Year: 2009).*

(Continued)

*Primary Examiner* — Ryan D Walsh
(74) *Attorney, Agent, or Firm* — Morgan, Lewis & Bockius LLP

(57) ABSTRACT

An estimation system includes: a first sensor that can be disposed between a wheel and a tire mounted on the wheel and outputs a first sensor signal in accordance with a pressing force applied by the wheel and the tire; and a processor that estimates a state of a rotating body including the wheel and the tire based on the first sensor signal. The processor generates a first section signal by dividing the first sensor signal by a specific section and estimates the state of the rotating body based on the first section signal.

20 Claims, 30 Drawing Sheets

(56) References Cited

U.S. PATENT DOCUMENTS

| | | | |
|---|---|---|---|
| 7,168,308 B2* | 1/2007 | Mancosu | B60C 23/0493 |
| | | | 73/146 |
| 9,120,356 B2* | 9/2015 | Patel | B60C 23/04 |
| 2010/0274607 A1 | 10/2010 | Carresjo et al. | |
| 2010/0281968 A1* | 11/2010 | Kubota | B60T 8/1725 |
| | | | 73/146 |
| 2011/0308683 A1 | 12/2011 | Crano | |
| 2020/0049581 A1 | 2/2020 | Thornham et al. | |
| 2020/0114706 A1* | 4/2020 | Vivek | B60B 21/12 |
| 2020/0173872 A1 | 6/2020 | Takedomi | |
| 2021/0028725 A1* | 1/2021 | Griswold | B60C 23/0486 |
| 2022/0134810 A1* | 5/2022 | Vivek | B29D 30/0061 |
| | | | 152/152.1 |

FOREIGN PATENT DOCUMENTS

| | | | |
|---|---|---|---|
| KR | 10-2009-0131378 A | | 12/2009 |
| KR | 20090131378 A | * | 12/2009 |

OTHER PUBLICATIONS

Apr. 4, 2023 Extended Search Report issued in European Patent Application No. 22207708.3.
Office Action dated Mar. 3, 2025, issued in corresponding European Patent Application No. 22 207 708.3.

\* cited by examiner

ESTIMATION SYSTEM, ESTIMATION METHOD, AND RECORDING MEDIUM

CROSS-REFERENCE TO RELATED APPLICATION

This application is based on Japanese Patent Application No. 2021-187948 filed with Japan Patent Office on Nov. 18, 2021 and claims the benefit of priority thereto. The entire contents of the Japanese patent application are incorporated herein by reference.

TECHNICAL FIELD

The present disclosure relates to an estimation system, an estimation method, and a recording medium.

BACKGROUND

Techniques for estimating the state of tires in a vehicle are known. For example, Japanese Unexamined Patent Application Publication No. 1996-247745 describes a technique for measuring a camber angle of a tire by using two laser devices disposed outside a tire/wheel assembly of an automobile with a space therebetween. Japanese Unexamined Patent Application Publication No. 2019-49488 describes a technique for estimating a load acting on a tire by using an acceleration sensor provided in an inner liner portion of the tire and located at a center in a width direction of the tire.

SUMMARY

In the technique described in Japanese Unexamined Patent Application Publication No. 1996-247745, since it is necessary to attach the laser devices to the outside of the tire, the device becomes large-scale, and there is a possibility that the device interferes with traveling of the vehicle. In the technique described in Japanese Unexamined Patent Application Publication No. 2019-49488, it is necessary to prepare a dedicated tire in which the acceleration sensor is attached to the inner liner portion.

The present disclosure describes an estimation system, an estimation method, and a recording medium capable of estimating a state of a rotating body with a simple configuration.

An estimation system according to one aspect of the present disclosure includes: a first sensor that can be disposed between a wheel and a tire mounted on the wheel and outputs a first sensor signal in accordance with a pressing force applied by the wheel and the tire; and a processor that estimates a state of a rotating body including the wheel and the tire based on the first sensor signal. The processor generates a first section signal by dividing the first sensor signal by a specific section and estimates the state of the rotating body based on the first section signal.

An estimation method according to another aspect of the present disclosure includes: acquiring a sensor signal in accordance with a pressing force applied by a wheel and a tire mounted on the wheel from a sensor disposed between the wheel and the tire; generating a section signal by dividing the sensor signal by a specific section; and estimating a state of a rotating body including the wheel and the tire based on the section signal.

A recording medium according to yet another aspect of the present disclosure is a non-transitory computer-readable recording medium recording an estimation program. The estimation program includes instructions that cause a computer to execute: acquiring a sensor signal in accordance with a pressing force applied by a wheel and a tire mounted on the wheel from a sensor disposed between the wheel and the tire; generating a section signal by dividing the sensor signal by a specific section; and estimating a state of a rotating body including the wheel and the tire based on the section signal.

According to each aspect and each embodiment of the present disclosure, a state of a rotating body can be estimated with a simple configuration.

DETAILED DESCRIPTION

Outline of Embodiments

Figure 1:
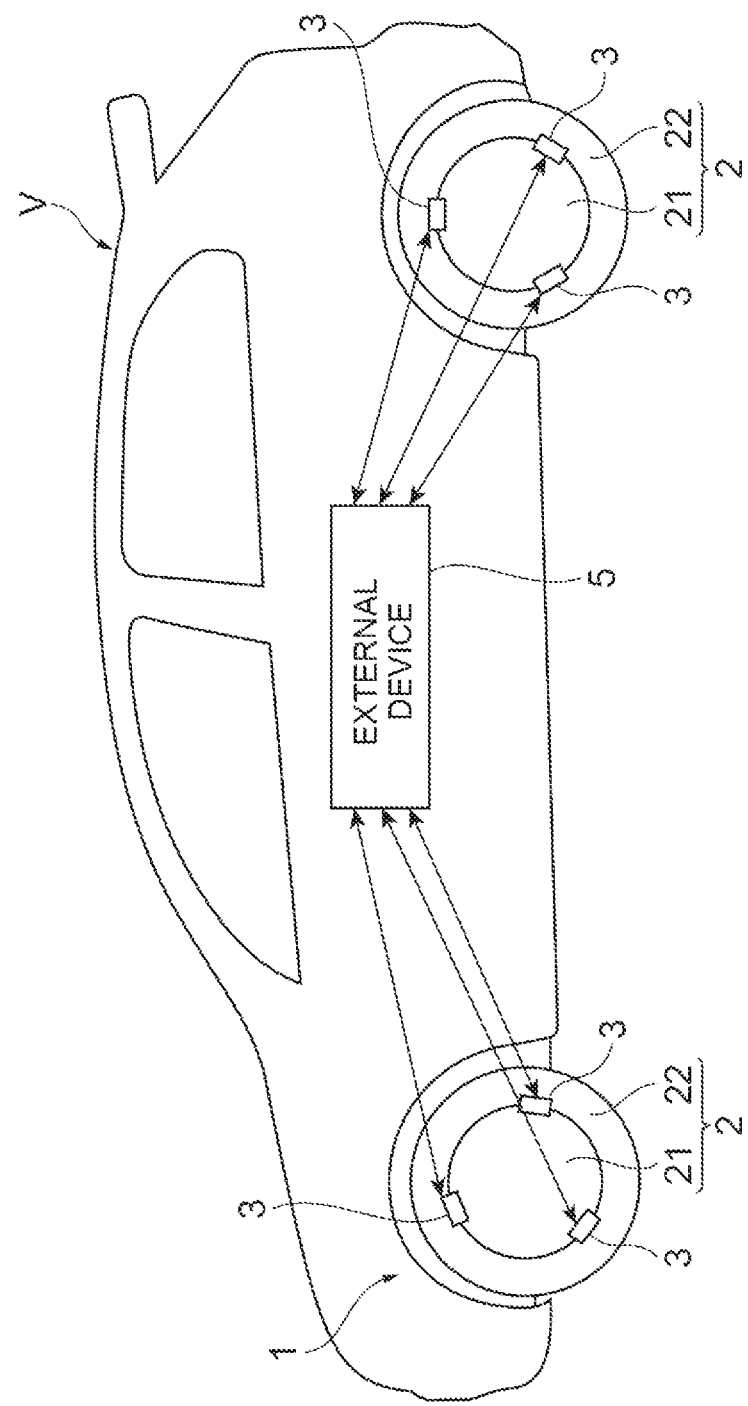
FIG. 1 is a diagram schematically showing a vehicle equipped with an estimation system according to an embodiment.

An estimation system according to one aspect of the present disclosure includes: a first sensor that can be disposed between a wheel and a tire mounted on the wheel and outputs a first sensor signal in accordance with a pressing force applied by the wheel and the tire; and a processor that estimates a state of a rotating body including the wheel and the tire based on the first sensor signal. The processor generates a first section signal by dividing the first sensor signal by a specific section and estimates the state of the rotating body based on the first section signal.

An estimation method according to another aspect of the present disclosure includes: acquiring a sensor signal in accordance with a pressing force applied by a wheel and a tire mounted on the wheel from a sensor disposed between the wheel and the tire; generating a section signal by dividing the sensor signal by a specific section; and estimating a state of a rotating body including the wheel and the tire based on the section signal.

A recording medium according to yet another aspect of the present disclosure is a non-transitory computer-readable recording medium recording an estimation program. The estimation program includes instructions that cause a computer to execute: acquiring a sensor signal in accordance with a pressing force applied by a wheel and a tire mounted on the wheel from a sensor disposed between the wheel and the tire; generating a section signal by dividing the sensor signal by a specific section; and estimating a state of a rotating body including the wheel and the tire based on the section signal.

In a technique according to the present disclosure including the estimation system, the estimation method, and the recording medium (hereinafter may be simply referred to as a "technique according to the present disclosure"), the sensor (first sensor) disposed between the wheel and the tire is configured to output a sensor signal (first sensor signal) in accordance with a pressing force by the wheel and the tire. A load from the vehicle acts on the sensor (first sensor) via the wheel. A reaction force from the road surface acts on the sensor (first sensor) via the tire. Since these forces can change depending on the state of the rotating body, the technique according to the present disclosure can estimate the state of the rotating body based on the sensor signal (first sensor signal). Therefore, according to the technique of the present disclosure, the state of the rotating body can be estimated with a simple configuration in which the sensor (first sensor) is disposed between the wheel and the tire.

In some embodiments, the first sensor may be disposed between a rim included in the wheel and the tire. When the wheel includes a rim, the tire is mounted on the rim. Therefore, the state of the rotating body can be estimated with a simple configuration in which the first sensor is disposed between the rim and the tire.

In some embodiments, the rotating body may include a first end and a second end that are both ends in a rotational axis direction of the rotating body. The first sensor may be disposed at a position closer to the first end than a center of the rotating body in the rotational axis direction. When the first sensor is disposed at the center of the rotating body in the rotational axis direction, for example, the first sensor signal changes in the same manner regardless of whether the camber angle changes in the positive direction or the negative direction. On the other hand, in the above configuration, the first sensor signal changes asymmetrically. This makes it possible to improve the estimation accuracy of the state of the rotating body.

In some embodiments, the estimation system may further include a second sensor that can be disposed between the wheel and the tire and outputs a second sensor signal in accordance with a pressing force applied by the wheel and the tire. The second sensor may be disposed at a position closer to the second end than the center of the rotating body in the rotational axis direction. The processor may generate a second section signal by dividing the second sensor signal by the specific section and estimates the state further based on the second section signal. In this case, the first sensor and the second sensor are disposed opposite to each other with respect to the center of the rotating body in the rotational axis direction. The first sensor signal output from the first sensor and the second sensor signal output from the second sensor change differently from each other in accordance with a change in the state of the rotating body. Therefore, since the state of the rotating body is estimated using two sensor signals in which different changes occur, it is possible to improve the estimation accuracy of the state of the rotating body compared with a configuration in which the state of the rotating body is estimated using one sensor signal.

In some embodiments, the specific section may be a section corresponding to one rotation of the rotating body. When the rotating body rotates, the portion of the rotating body that comes into contact with the road surface changes, and thus the relative positional relationship between the first sensor and the contact portion changes. For this reason, the first sensor signal has a periodicity such that the waveform shape becomes similar every time the rotating body makes one rotation. Therefore, the state of the rotating body can be estimated by analyzing the first section signal corresponding to one rotation of the rotating body.

In some embodiments, the processor may estimate the state of the rotating body based on a plurality of waveform characteristics, which are different from each other, calculated from the first section signal. The waveform characteristic calculated from the first section signal can be an index indicating the state of the rotating body. Therefore, by using these characteristics, it is possible to improve the estimation accuracy of the state of the rotating body.

In some embodiments, the plurality of waveform characteristics may include a value based on at least one of a maximum value of the first section signal, a minimum value of the first section signal, a difference between the maximum value and the minimum value of the first section signal, a standard deviation of the first section signal, a variance of the first section signal, an average value of the first section signal, a median value of the first section signal, and a value at an inflection point of the first section signal. By using these characteristics, it is possible to improve the estimation accuracy of the state of the rotating body.

In some embodiments, the processor may estimate the state of the rotating body by using a machine learning model for estimating the state of the rotating body. In this case, it is possible to improve the estimation accuracy of the state of the rotating body by sufficiently learning the machine learning model.

In some embodiments, the state of the rotating body may include at least one of a camber angle, a slip angle, a load applied to the rotating body, and air pressure. A tendency of change in the first sensor signal when the camber angle changes, a tendency of change in the first sensor signal when the slip angle changes, a tendency of change in the first sensor signal when the load changes, and a tendency of change in the first sensor signal when the air pressure changes are different from each other. Therefore, the camber angle, the slip angle, the load, and the air pressure can be estimated separately.

In some embodiments, the first sensor and the processor may constitute a sensor module. The sensor module may be provided in the rotating body. The processor may output an estimation result to an external device provided outside the rotating body. In this case, the first sensor signal is processed in the sensor module, and the estimation result is output to the external device. The amount of communication between the sensor module and the external device can be reduced compared with that of a configuration in which the first sensor signal is processed in the external device.

In some embodiments, the first sensor may be a piezoelectric element that generates electric energy in accordance with the pressing force. The processor may operate using the electric energy generated by the piezoelectric element. In this case, the processor can operate without receiving electric power from the outside. Accordingly, wiring or the like for supplying electric power from the outside is not necessary, so that the configuration of the estimation system can be simplified.

In some embodiments, the first sensor may be a piezoelectric element that generates electric energy in accordance with the pressing force. The processor may estimate the state of the rotating body by using a voltage or an electric current of the electric energy generated by the piezoelectric element as the first sensor signal. In this case, the state of the rotating body can be estimated with a simple configuration in which the piezoelectric element is disposed between the wheel and the tire.

Exemplary Embodiments

Hereinafter, embodiments of the present disclosure will be described in detail with reference to the drawings. In the description of the drawings, the same elements are designated with the same reference numerals, and the redundant description is omitted.

Figure 2:
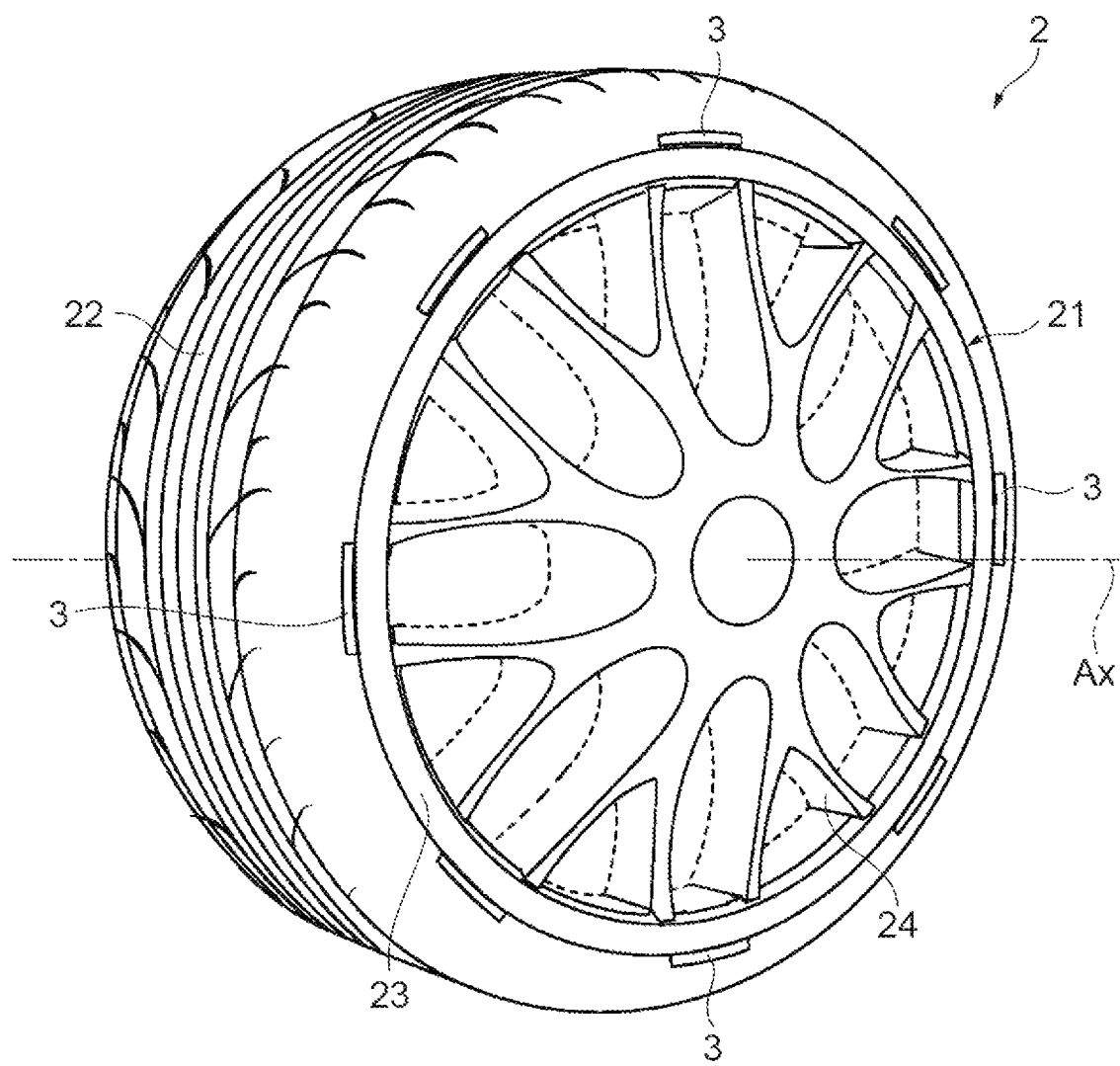
FIG. 2 is a perspective view of the rotating body shown in FIG. 1.
Figure 3:
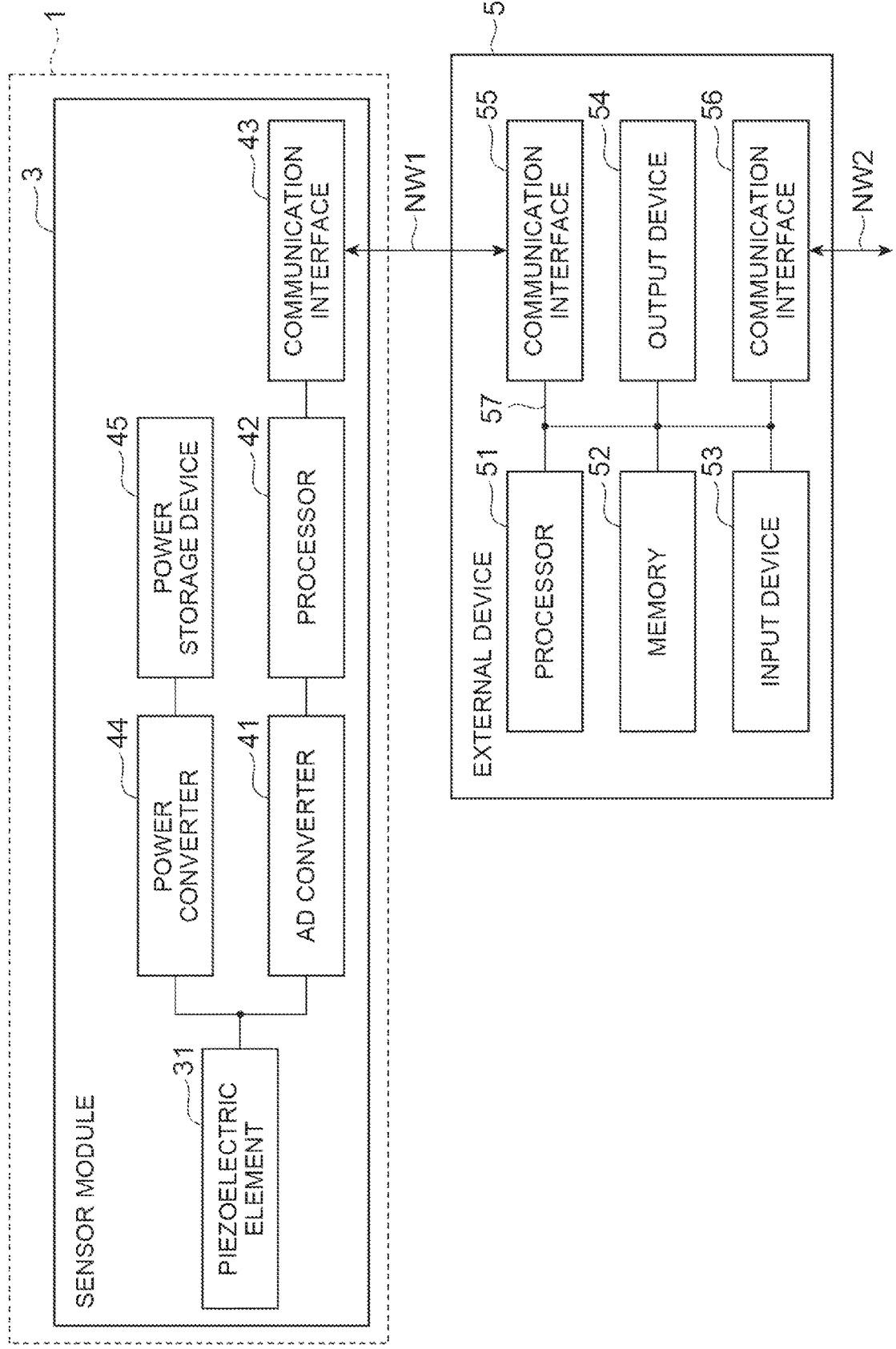
FIG. 3 is a configuration diagram schematically showing the configuration of the estimation system shown in FIG. 1.
Figure 4:
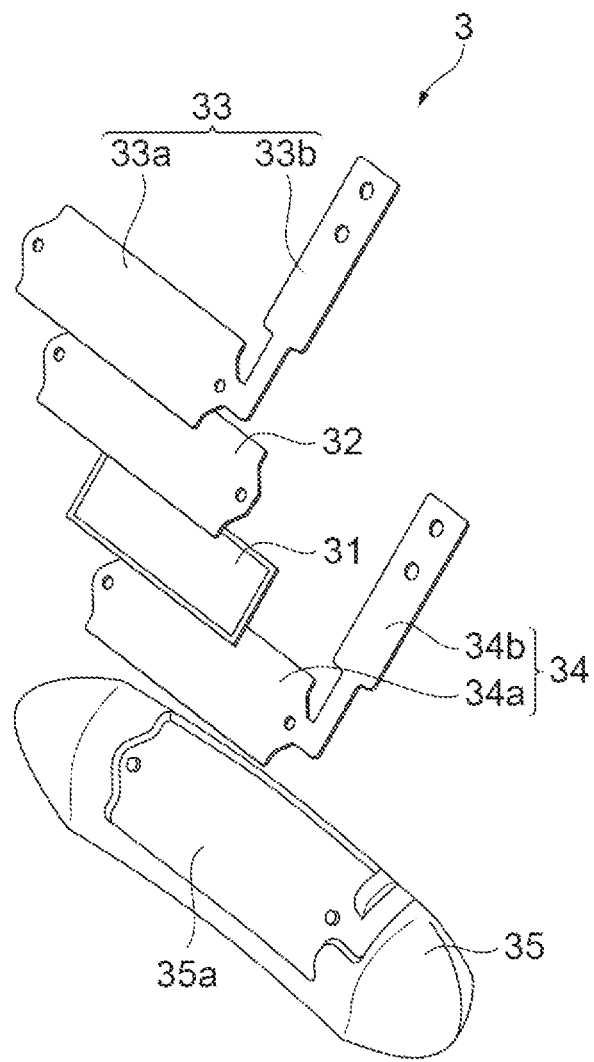
FIG. 4 is an exploded perspective view of the sensor module shown in FIG. 1.

An estimation system according to an embodiment will be described with reference to FIGS. 1 to 4. FIG. 1 is a diagram schematically showing a vehicle equipped with an estimation system according to an embodiment. FIG. 2 is a perspective view of the rotating body shown in FIG. 1. FIG. 3 is a configuration diagram schematically showing the configuration of the estimation system shown in FIG. 1. FIG. 4 is an exploded perspective view of the sensor module shown in FIG. 1. An estimation system 1 shown in FIG. 1 is a system that estimates a state of a rotating body 2. The estimation system 1 can be mounted on a vehicle V, for example. The vehicle V includes the rotating body 2 and is configured to be movable by rotation of the rotating body 2. Examples of the vehicle V may include an automobile, a bicycle, and a motorcycle. The present embodiment will be described using an automobile as an example of the vehicle V, but the technique according to the present disclosure is not limited to application to an automobile. The vehicle V includes four rotating bodies 2 provided on front, rear, left, and right sides.

As shown in FIG. 2, the rotating body 2 is an element that is rotatable about a rotational axis AX. The rotating body 2 has an outer end portion 2a (first end; see FIG. 14) and an inner end portion 2b (second end; see FIG. 14). The outer end portion 2a and the inner end portion 2b are both ends of the rotating body 2 in a direction in which the rotational axis AX extends (rotational axis direction). The outer end portion 2a faces the outside of the vehicle V. The rotating body 2 includes a wheel 21 and a tire 22.

The wheel 21 is a member that transmits rotational force about the rotational axis AX to the tire 22. The wheel 21 may be made of a member having rigidity. Examples of the constituent material of the wheel 21 may include metal materials such as steel, magnesium, aluminum, and stainless steel, and may include resin materials such as carbon fiber. In the specific example shown in FIG. 2, the wheel 21 includes a rim 23 and a plurality of spokes 24. The rim 23 is an annular member that defines an outer edge of the wheel 21. The tire 22 is mounted along the outer circumference of the rim 23. Each of the plurality of spokes 24 extends radially from the center of the wheel 21 to the rim 23. The rim 23 and the spoke 24 may be integrally formed, or may be formed as separate bodies.

The tire 22 is an annular member mounted on the wheel 21. The tire 22 is provided along an outer circumference (rim 23) of the wheel 21. The tire 22 may be made of a member having flexibility. An example of a constituent material of the tire 22 may include a resin such as rubber.

As shown in FIG. 3, the estimation system 1 includes a sensor module 3. The sensor module 3 is a module capable of detecting a pressing force acting on the rotating body 2. The sensor module 3 is provided in the rotating body 2. Specifically, the sensor module 3 is disposed between the wheel 21 (rim 23) and the tire 22. For example, the sensor module 3 may be sandwiched between the wheel 21 (rim 23) and the tire 22 in the vertical direction. In the present embodiment, a plurality of sensor modules 3 are provided at equal intervals along the outer circumference of the wheel 21 (rim 23). Several sensor modules 3 are disposed in the outer end portion 2a (outer rim). The sensor module 3 may be disposed in an inner end portion 2b (inner rim).

The number and positions of the sensor modules 3 provided in one rotating body 2 can be selected as appropriate. In the present embodiment, a plurality of sensor modules 3 are provided in one rotating body 2. However, for example, one sensor module 3 may be provided in one rotating body 2. The number of sensor modules provided in one rotating body 2 is not limited to this configuration, and may be, for example, 2, 3, 4, 5, 6, 7, 8, 9, 10, or 11 or more. For example, the same number of sensor modules 3 as the spokes 24 may be provided in one rotating body 2. For example, the same number of sensor modules 3 as the interval between two spokes 24 adjacent to each other may be provided in one rotating body 2. In the case where a plurality of sensor modules 3 are provided in one rotating body 2, the sensor modules 3 may be arranged at equal intervals along the outer circumference of the wheel 21 (rim 23), for example. As another configuration, the plurality of sensor modules 3 may be arranged at different intervals along the outer circumference of the wheel 21 (rim 23). As yet another configuration, at least some of the plurality of sensor modules 3 may be arranged at equal intervals along the outer circumference of the wheel 21 (rim 23), and the other sensor modules 3 may be arranged at different intervals along the outer circumference of the wheel 21 (rim 23).

In the specific example shown in FIG. 4, each sensor module 3 is configured to be disposed between the wheel 21

(rim 23) and the tire 22. Each sensor module 3 includes a piezoelectric element 31 (first sensor), a back plate 32, a substrate 33, a substrate 34, and a base material 35. The piezoelectric element 31 is an element that generates electric energy in accordance with an external force such as a pressing force acting on the piezoelectric element 31. An example of the piezoelectric element 31 may include a piezo ceramic element (piezo element). The piezoelectric element 31 may be formed in a plate shape.

The back plate 32 is a plate-like member that protects the piezoelectric element 31. The back plate 32 may be made of a metal member (for example, stainless steel) or a resin member. The back plate 32 has, for example, a plate-like shape slightly larger than the piezoelectric element 31. The back plate 32 can also relax the stress of the piezoelectric element 31 by being superimposed on the piezoelectric element 31. The deformation amount of the piezoelectric element 31 in accordance with the pressing force acting on the sensor module 3 is adjusted by the thickness of the back plate 32.

The substrates 33 and 34 are plate-like members that extract electric energy generated in the piezoelectric element 31 as a sensor signal (first sensor signal). Specifically, the substrates 33 and 34 may extract a voltage or an electric current of electric energy generated in the piezoelectric element 31 as a sensor signal. In the present embodiment, a case where a voltage is handled as a sensor signal will be described as an exemplary case. The substrates 33 and 34 may be flexible printed circuits (FPC). The substrate 33 may be configured to include, for example, a main body portion 33$a$ and a wiring portion 33$b$. The main body portion 33$a$ is a portion forming a laminated structure described later. The wiring portion 33$b$ is a portion that connects the sensor module 3 to an external circuit or the like. The substrate 34 includes a main body portion 34$a$ and a wiring portion 34$b$. The main body portion 34$a$ is a portion forming the laminated structure described later. The wiring portion 34$b$ is a portion that connects the sensor module 3 to an external circuit or the like. In the present embodiment, the shape of the substrate 33 is substantially the same as the shape of the substrate 34, but the shape of the substrate 33 may be different from the shape of the substrate 34. The main body portions 33$a$ and 34$a$ may be formed to have substantially the same size as the back plate 32, for example.

The base material 35 is a member for attaching the sensor module 3 to the wheel 21. The base material 35 has a shape following the rim 23. The base material 35 is provided with a recess 35$a$ capable of accommodating the laminated structure described later.

In the specific example shown in FIG. 4, the back plate 32 is superimposed on the piezoelectric element 31, and the piezoelectric element 31 and the back plate 32 superimposed on each other are sandwiched between the main body portion 33$a$ of the substrate 33 and the main body portion 34$a$ of the substrate 34. That is, the laminated structure is formed by laminating the substrate 33, the back plate 32, the piezoelectric element 31, and the substrate 34 in this order, and the laminated structure is accommodated in the recess 35$a$ of the base material 35. In this manner, the sensor module 3 is manufactured. The sensor module 3 is disposed at a desired position between the rim 23 and the tire 22. In the specific example shown in FIG. 4, the sensor module 3 may be disposed in the rotating body 2 so that the surface of the base material 35 opposite to the surface on which the recess 35$a$ is provided is in contact with the rim 23. In this case, the surface of the main body portion 33$a$ of the substrate 33 opposite to the back plate 32 is in contact with the tire 22.

Each sensor module 3 includes, for example, the piezoelectric element 31 as a circuit element. Each sensor module 3 may include, for example, an analog-to-digital (AD) converter 41, a processor 42, a communication interface 43, a power converter 44, and a power storage device 45 in addition to the piezoelectric element 31. The AD converter 41, the processor 42, the communication interface 43, the power converter 44, and the power storage device 45 may be mounted on the substrate 33 or the substrate 34.

The AD converter 41 is a circuit element that converts a sensor signal that is an analog signal output from the piezoelectric element 31 into a sensor signal that is a digital signal. The AD converter 41 outputs the sensor signal that is a digital signal to the processor 42.

The processor 42 is a circuit element that estimates the state of the rotating body 2 based on the sensor signal. The state of the rotating body 2 estimated by the processor 42 includes at least one of a camber angle, a slip angle, a load applied to the rotating body 2, and air pressure. The processor 42 may output the estimation result to the external device 5 via the communication interface 43. Details of the processing performed by the processor 42 will be described later. Examples of processor 42 include, but are not limited to, a central processing unit (CPU), a digital signal processor (DSP), an attached support processor (ASP), a microcomputer, a programmable logic controller (PLC), a field programmable gate array (FPGA), an application specific integrated circuit (ASIC), and an integrated circuit (IC). The processor 42 may have a multi-core configuration.

The communication interface 43 is hardware that enables the sensor module 3 to transmit and receive data to and from the external device 5 via a communication network NW1. The communication network NW1 may be configured as a wired communication network, may be configured as a wireless communication network, or may be configured as a communication network including both of them. Examples of the communication network NW1 may include one or more of the Internet, an intranet, a wide area network (WAN), a local area network (LAN), Bluetooth (Registered Trademark), a wireless LAN (such as Wi-Fi), a controller area network (CAN), a mobile communication network, and the like. The communication interface 43 may conform to a specific communication protocol, for example.

The power converter 44 is a device that converts the sensor signal (voltage) generated by the piezoelectric element 31 so as to be able to charge the power storage device 45. The power converter 44 is, for example, a power conditioner. As described later, when the sensor signal includes a AC signal that periodically changes, the power converter 44 may include a rectifier circuit.

The power storage device 45 is a chargeable and dischargeable device. The power storage device 45 stores the sensor signal generated by the piezoelectric element 31 as electric energy (electric power) and supplies the electric energy to the circuit elements in the sensor module 3. For example, the processor 42 operates using electric energy generated by the piezoelectric element 31. Examples of the power storage device 45 may include a storage battery such as a lithium ion battery, and a capacitor.

The external device 5 is a device capable of communicating with the sensor module 3. For example, the external device 5 may be configured to present an estimation result related to the state of the rotating body 2 to a person (occupant) riding in the vehicle V. The external device 5 may be configured to provide the estimation result related to the state of the rotating body 2 to other devices included in the vehicle V, for example. The external device 5 may be configured to provide the estimation result related to the state of the rotating body 2 to a device (for example, a server or the like to which the external device 5 is connectable via a communication line) disposed outside the vehicle V, for example.

The external device 5 may be provided outside the rotating body 2 and disposed in the vehicle V. Examples of the external device 5 may include an in-vehicle device and a mobile terminal owned by an occupant. Examples of the mobile terminal may include a smart phone, a tablet terminal, a laptop computer, and the like. The external device 5 may include, for example, a processor 51, a memory 52, and a communication interface 55. The external device 5 may further include, for example, an input device 53, an output device 54, and a communication interface 56.

The processor 51 is a circuit element that performs control and computation in the external device 5. The processor 51 is configured in the same manner as the processor 42. Examples of the processor 51 include, but are not limited to, a CPU, a DSP, an ASP, a microcomputer, a PLC, an FPGA, an ASIC, and an IC. The processor 51 may have a multi-core configuration. The memory 52 may include a main storage device and an auxiliary storage device. The main storage device is constituted by a random access memory (RAM), a read only memory (ROM), and the like. Examples of the auxiliary storage device include a semiconductor memory and a hard disk device.

The input device 53 is a device that receives an input from a user of the external device 5. Examples of the input device 53 may include a touch panel, a keyboard, and a mouse. The output device 54 is a device that outputs information to the outside of the external device 5. Examples of the output device 54 may include a display and a speaker.

The communication interface 55 is hardware that enables the external device 5 to transmit and receive data to and from the sensor module 3 via the communication network NW1. The communication interface 55 may conform to a specific communication protocol, for example. The communication interface 56 is hardware that enables the external device 5 to transmit and receive data to and from devices disposed outside the vehicle V (for example, a server (not shown) or the like to which the external device 5 is connectable via the communication network NW2) via the communication network NW2. The communication network NW2 may be configured by wired communication, may be configured by wireless communication, or may be configured by a combination thereof. Examples of the communication network NW2 may include one or more of the Internet, an intranet, a WAN, a LAN, Bluetooth (Registered Trademark), Wi-Fi, a mobile communication network, and the like. The communication interface 56 may conform to a specific communication protocol, for example.

The processor 51, the memory 52, the input device 53, the output device 54, the communication interface 55, and the communication interface 56 may be communicatively connected to each other by, for example, a bus 57.

Figure 5:
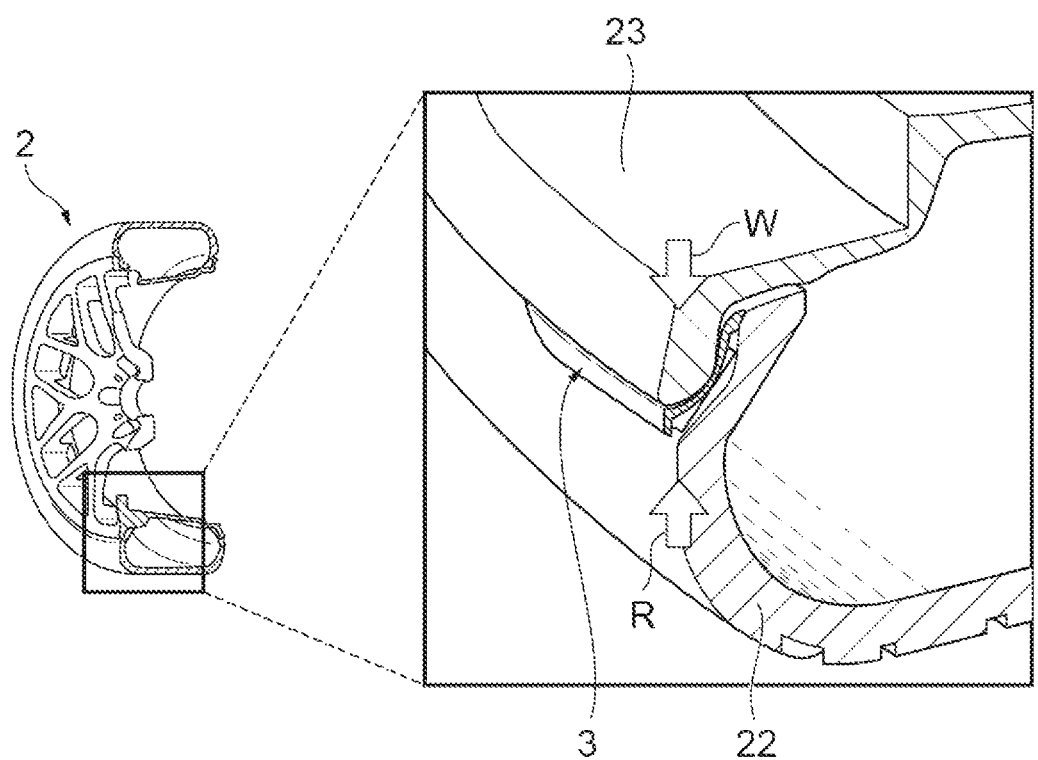
FIG. 5 is a diagram for explaining a force acting on the sensor module shown in FIG. 1.
Figure 6:
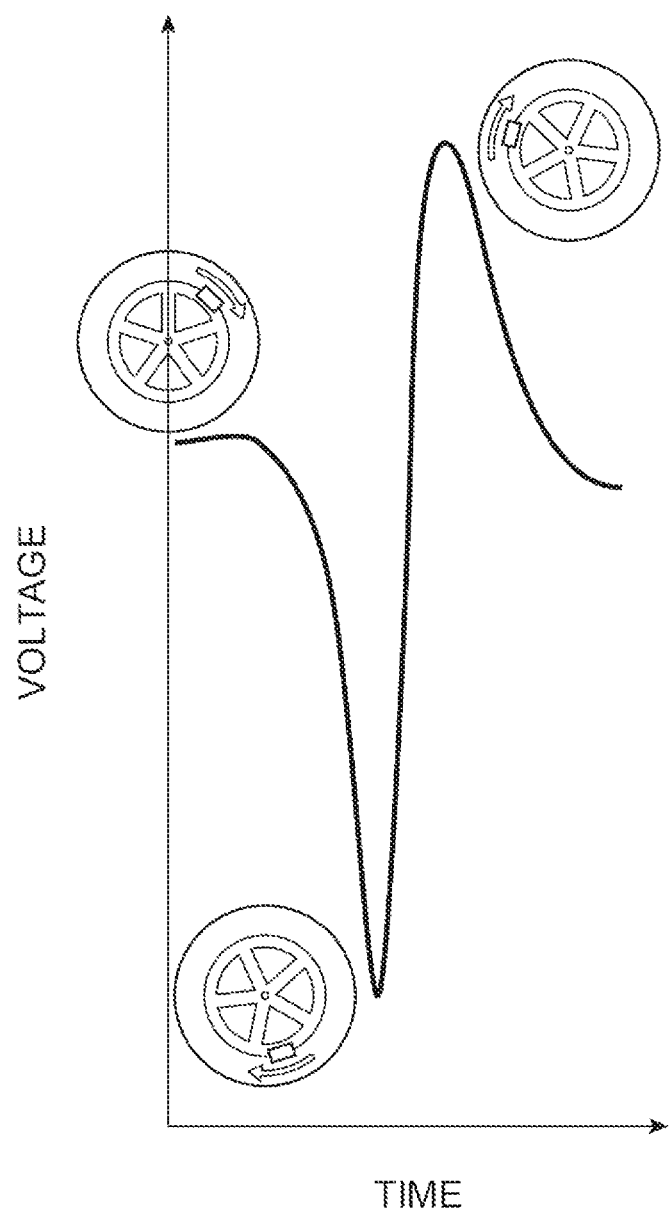
FIG. 6 is a diagram for explaining a sensor signal output from the sensor shown in FIG. 1.
Figure 7:
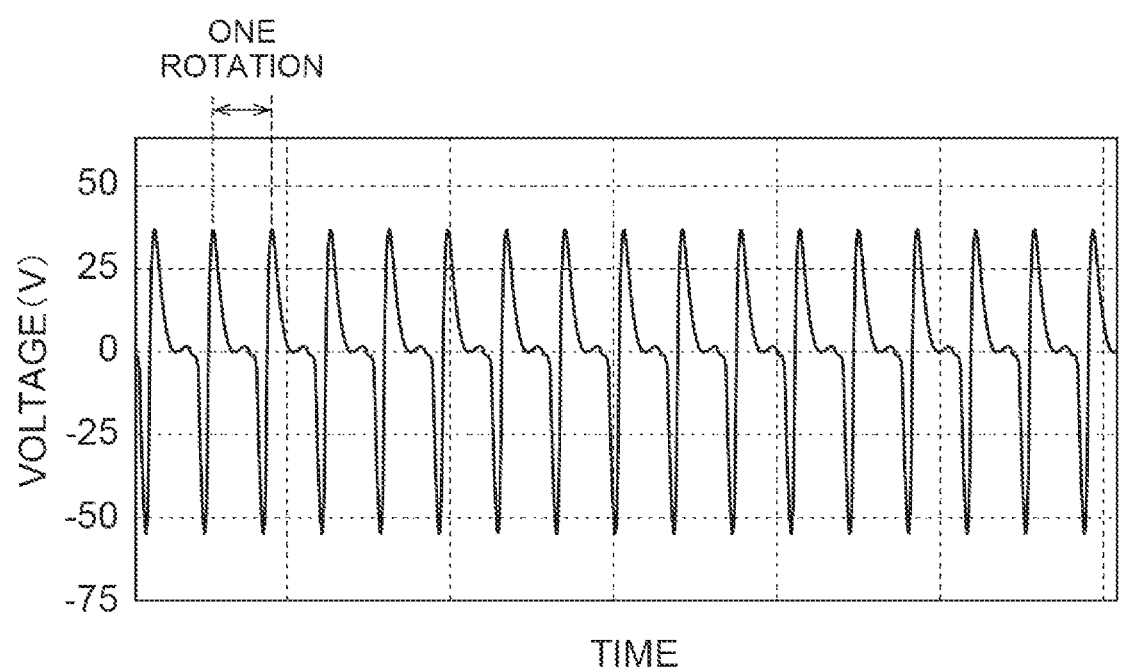
FIG. 7 is a diagram showing an example of a sensor signal during constant-speed travel.
Figure 8:
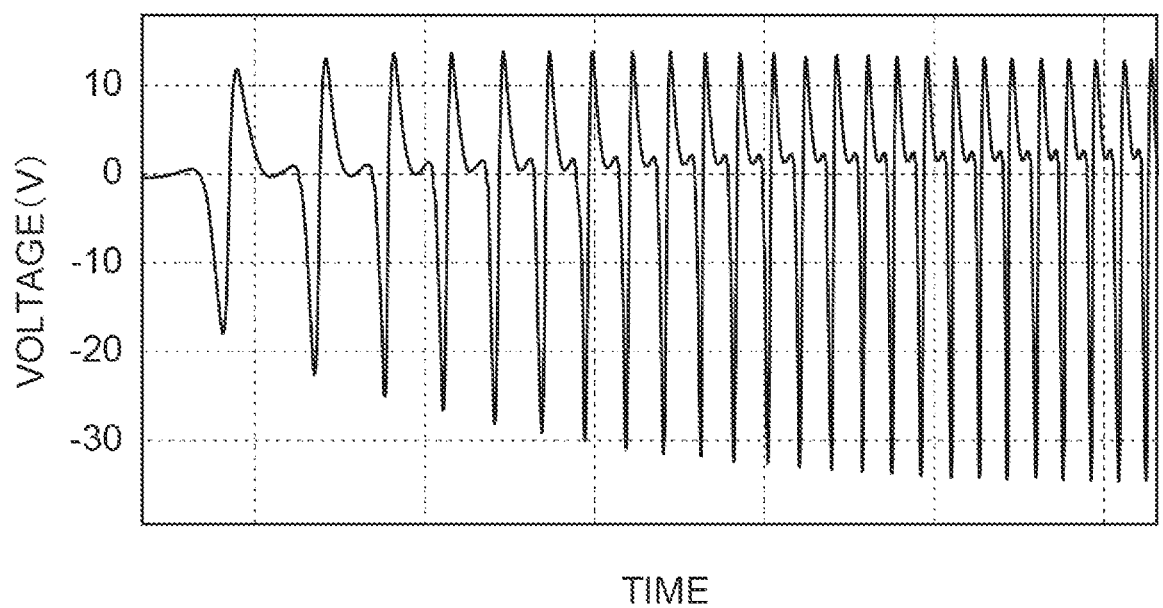
FIG. 8 is a diagram showing an example of a sensor signal during acceleration travel.

Next, the sensor signal will be described in detail with reference to FIGS. 5 to 8. FIG. 5 is a diagram for explaining a force acting on the sensor module shown in FIG. 1. FIG. 6 is a diagram for explaining a sensor signal output from the sensor shown in FIG. 1. FIG. 7 is a diagram showing an example of a sensor signal during constant-speed travel. FIG. 8 is a diagram showing an example of a sensor signal during acceleration travel.

In the specific example shown in FIG. 5, the sensor module 3 is disposed between an outer flange of the rim 23 and a bead of the tire 22 and is in contact with the flange of the rim 23 and the bead of the tire 22. The weight W of the vehicle V acts as a pressing force on the piezoelectric element 31 via the wheel 21 (rim 23), and the reaction force R from the road surface acts as a pressing force on the piezoelectric element 31 via the tire 22. The piezoelectric element 31 outputs a sensor signal in accordance with a pressing force by the wheel 21 and the tire 22. Specifically, the magnitude of the sensor signal changes depending on, for example, the magnitude of the pressing force acting on the piezoelectric element 31 and the amount of change in the pressing force per unit time. In the present embodiment, the sensor module 3 is configured to output a negative sensor signal when the piezoelectric element 31 receives a pressing force, but may be configured to output a positive sensor signal when the piezoelectric element 31 receives a pressing force. As the pressing force acting on the piezoelectric element 31 increases, the absolute value of the sensor signal increases.

Specifically, during one rotation of the rotating body 2, a portion of the rotating body 2 (the outer circumferential surface of the tire 22) in contact with the road surface changes, and thus the relative positional relationship between the piezoelectric element 31 and the road surface changes. For example, as the piezoelectric element 31 approaches the road surface, the weight W of the vehicle V acting on the piezoelectric element 31 via the wheel 21 (rim 23) increases, and the reaction force R from the road surface acting on the piezoelectric element 31 via the tire 22 increases. When the piezoelectric element 31 comes closest to the road surface, the weight W of the vehicle V acting on the piezoelectric element 31 via the wheel 21 (rim 23) becomes the largest, and the reaction force R from the road surface acting on the piezoelectric element 31 via the tire 22 becomes the largest. At this time, the portion of the tire 22 located between the rim 23 and the road surface is compressed to be elastically deformed. When the rotating body 2 further rotates, the weight W of the vehicle V acting on the piezoelectric element 31 via the wheel 21 (rim 23) decreases, and the reaction force R from the road surface acting on the piezoelectric element 31 via the tire 22 also decreases. Then, the compressed tire 22 is restored. At this time, elastic vibration may occur in the tire 22, and in this case, the stress acting on the piezoelectric element 31 is damped while vibrating.

In the specific example shown in FIG. 6, during one rotation of the rotating body 2, the sensor signal has a steep peak convex in the negative direction and then has a steep peak convex in the positive direction. The sensor signal then is damped while vibrating. When the vehicle V is traveling at a constant speed, the rotation speed of the rotating body 2 is substantially constant. Therefore, as shown in FIG. 7, the waveform for one rotation is repeated at a constant period. When the vehicle V is accelerating, the rotation speed of the rotating body 2 gradually increases. Therefore, as shown in FIG. 8, the period of the waveform for one rotation is shortened. During acceleration travel, the reaction force from the road surface may increase, and in this case, the absolute value of the negative peak gradually increases.

Figure 9:
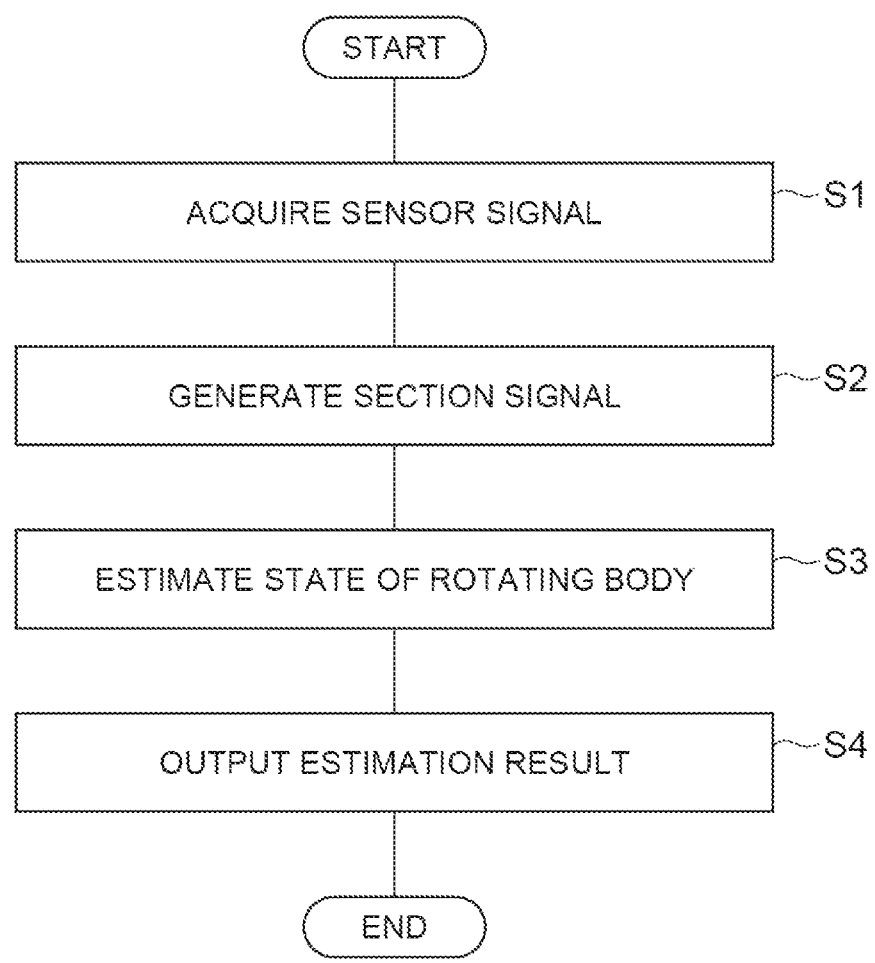
FIG. 9 is a flowchart showing an estimation method performed by the processor shown in FIG. 1.

An estimation method performed by the processor 42 will be described with reference to FIG. 9. FIG. 9 is a flowchart showing an estimation method performed by the processor shown in FIG. 1. The processor 42 may perform the estimation method by, for example, reading out an estimation program stored in a computer-readable non-transitory recording medium and executing the estimation program. Examples of the recording medium may include a ROM that can be accessed by the processor 42. The series of processes shown in FIG. 9 is started, for example, every time a certain time elapses.

First, the processor 42 acquires a sensor signal from the piezoelectric element 31 (step S1). Specifically, the processor 42 may acquire a sensor signal converted into a digital signal by the AD converter 41, for example.

Figure 10:
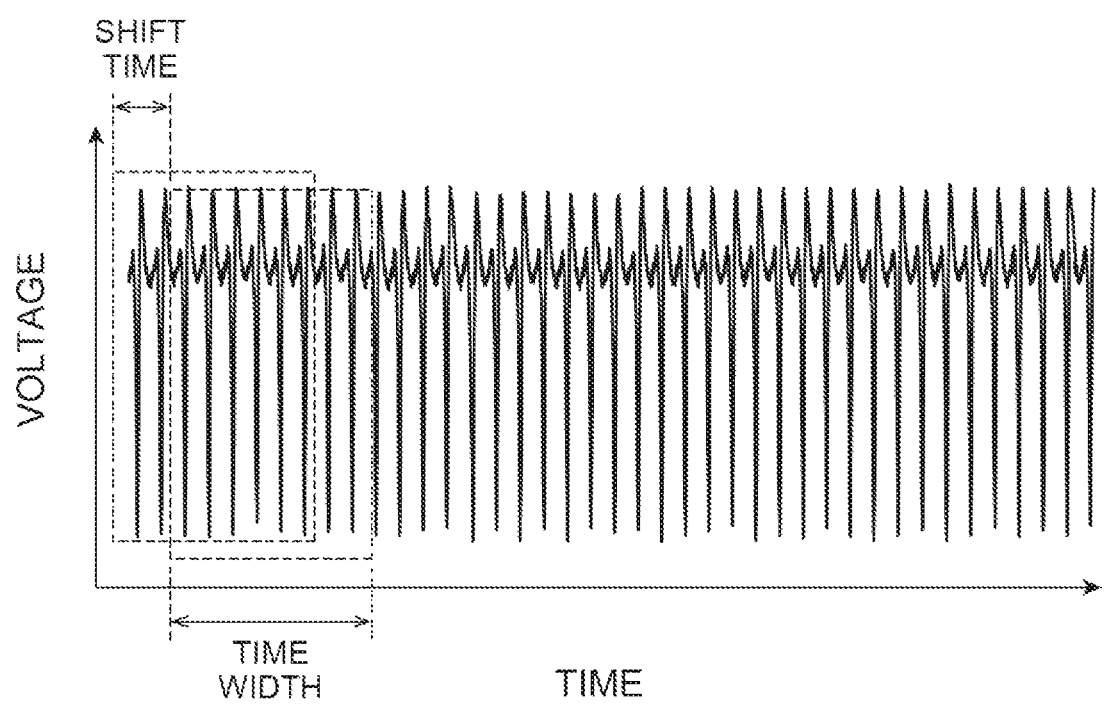
FIG. 10 is a diagram for explaining an example of a process of generating a section signal.
Figure 11:
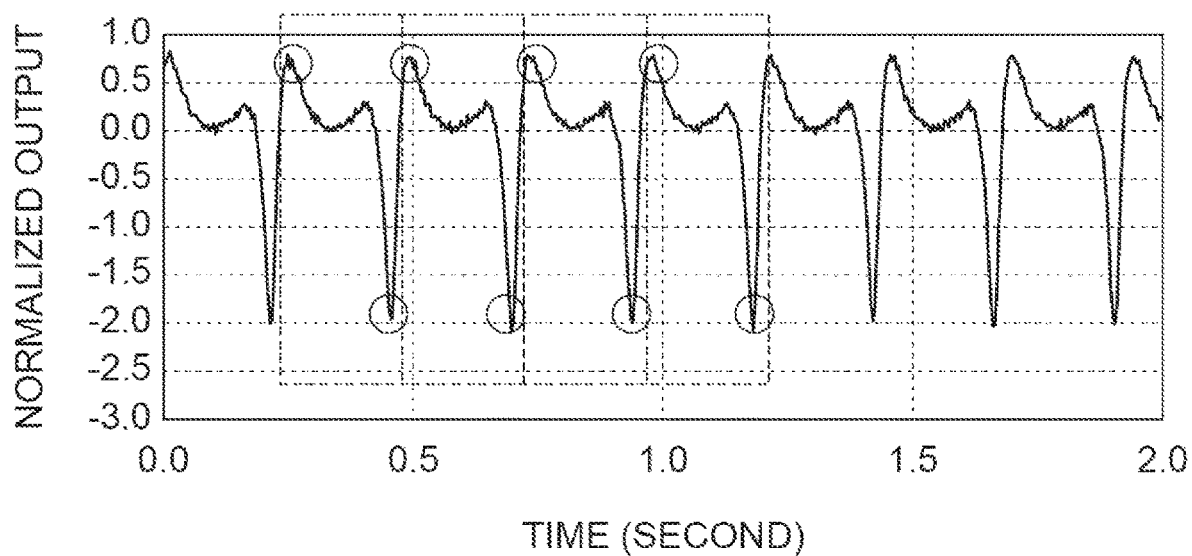
FIG. 11 is a diagram for explaining another example of a process of generating a section signal.
Figure 12:
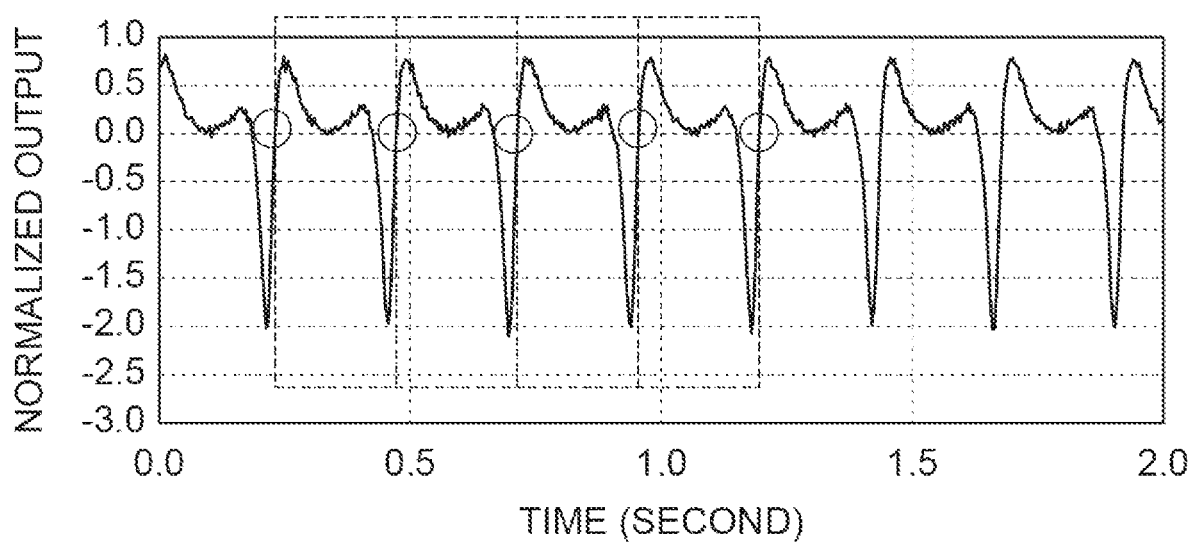
FIG. 12 is a diagram for explaining yet another example of a process of generating a section signal.
Figure 13:
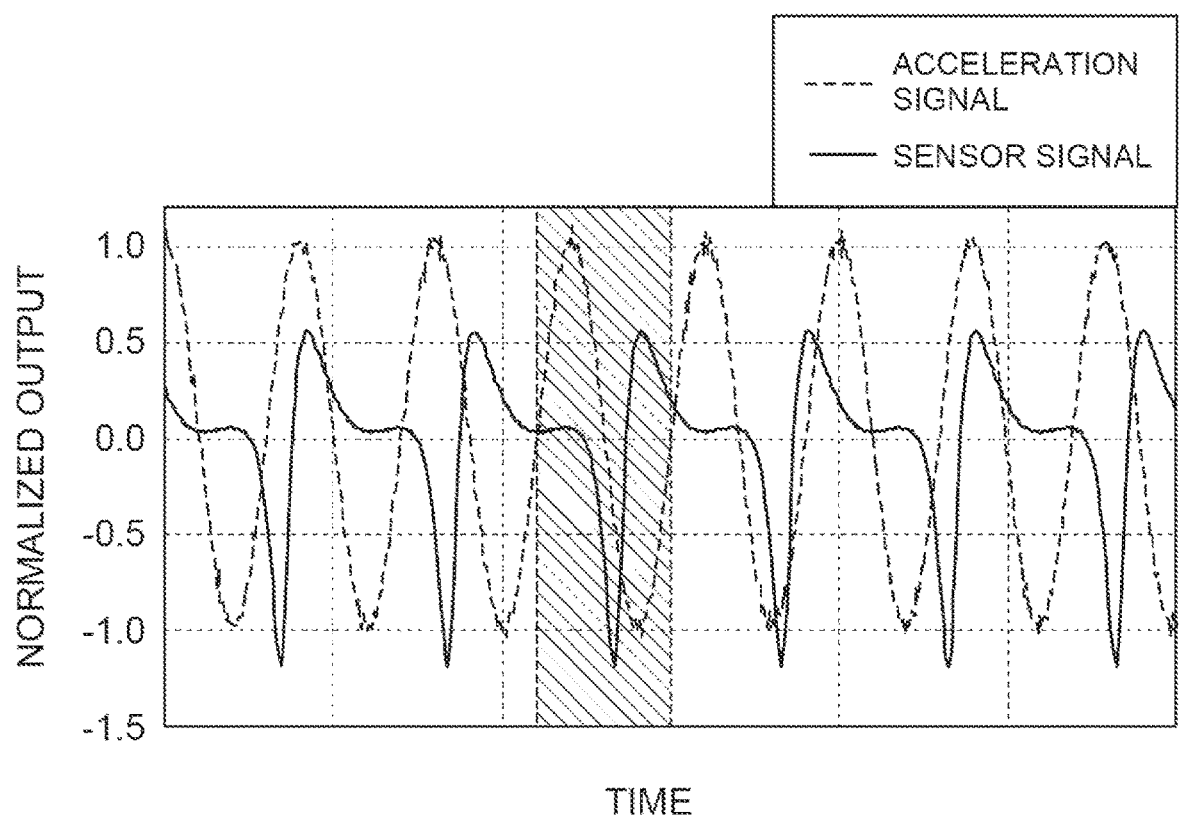
FIG. 13 is a diagram for explaining yet another example of a process of generating a section signal.

Subsequently, the processor 42 generates a section signal by dividing the sensor signal by a specific section (step S2). Some examples of a process of generating a section signal will be described below with reference to FIGS. 10 to 13, but a process of generating a section signal is not limited to these examples. FIGS. 10 to 13 are diagrams for describing an example of a process of generating a section signal. The horizontal axes of FIGS. 10 to 13 represent time. The vertical axis of FIG. 10 represents voltage. The vertical axes of FIGS. 11 to 13 represent normalized outputs. The normalized output means a value obtained by dividing the voltage value of the sensor signal by a predetermined voltage value. The sensor signal may include a noise component. Accordingly, the processor 42 may remove the noise component from the sensor signal and generate the section signal using the sensor signal from which the noise component has been removed.

As shown in FIG. 10, the processor 42 may divide the sensor signal into certain section signals by window control. Specifically, the processor 42 may use a window having a time width and select a portion of the sensor signal included in the window as the section signal. The time width of the window may be a fixed value given in advance or may be a set value that can be changed. The time width of the window is, for example, about 5 seconds. The time width of the window is not limited to this and may be 1 second or more and less than 5 seconds or may be 5 seconds or more. The processor 42 shifts the window by a certain time and selects the portion of the sensor signal included in the shifted window as the next section signal. The time for shifting the window (shift time) may be, for example, about one second. The shift time is not limited to this, and may be a time equal to or shorter than the time width of the window. In the same manner, the processor 42 selects the section signal every time the window is shifted. According to this approach, the processing load of the processor 42 may be reduced by using a fixed window, for example.

The time width of the window may be dynamically set. For example, the processor 42 may specify the fundamental period of the sensor signal using a fast Fourier transform (FFT) and set the fundamental period as the time width of the window.

As another approach, as shown in FIG. 11, the processor 42 may select a section signal using local maximum values and local minimum values included in the sensor signal. Specifically, the processor 42 may specify, for example, a peak in a section exceeding a threshold value for determining a local maximum value in the sensor signal as the local maximum value. For example, the processor 42 may specify a peak (bottom) in a section falling below a threshold value for determining a local minimum value in the sensor signal as the local minimum value. The threshold for determining a local maximum value and the threshold for determining a local minimum value may be set in advance. In a case where the local maximum value and the local minimum value alternately appear in the sensor signal, the processor 42 may specify the local maximum value and the local minimum value by using this fact as a constraint condition. In this case, the processor 42 may set a window to include one local maximum value and one local minimum value that are appear consecutively, and may select a portion of the sensor signal included in the window as the section signal.

When the rotating body 2 rotates while being in contact with the road surface, in some situations, a local minimum value of the sensor signal appears when the piezoelectric element 31 comes closest to the road surface, and a local maximum value of the sensor signal appears when the piezoelectric element 31 moves away from the road surface (when the pressing force acting on the piezoelectric element 31 is released). In this case, a section including one local maximum value and one local minimum value that are appear consecutively may correspond to a sensor signal for one rotation of the rotating body 2. As described above, according to the present approach, even when the rotation speed of the rotating body 2 changes, the sensor signal corresponding to one rotation of the rotating body 2 can be selected as the section signal. In this case, according to the present approach, a section corresponding to one rotation of the rotating body 2 can be selected as the above-described specific section, and the processor 42 can generate section signals by dividing the sensor signal into sections corresponding to one rotation of the rotating body 2.

As yet another approach, as shown in FIG. 12, the processor 42 may select a section signal using zero crossing points included in the sensor signal. Specifically, the processor 42 specifies, for example, a zero crossing point when the sensor signal changes from a negative value to a positive value in the sensor signal. Then, the processor 42 sets a section between two continuous zero crossing points as a window, and selects a portion of the sensor signal included in the window as the section signal.

When the rotating body 2 rotates while being in contact with the road surface, in some situations, the sensor signal steeply changes from a local minimum value to a local maximum value while the piezoelectric element 31 moves away from the road surface after moving closest to the road surface. In this case, the zero crossing point when the sensor signal changes from a negative value to a positive value appears when the piezoelectric element 31 moves away from the road surface after moving closest to the road surface. Therefore, a section defined by two consecutive zero crossing points may correspond to a sensor signal for one rotation of the rotating body 2. As described above, according to the present approach, even when the rotation speed of the rotating body 2 changes, the sensor signal corresponding to one rotation of the rotating body 2 can be selected as the section signal. In this case, according to the present approach, a section corresponding to one rotation of the rotating body 2 can be selected as the above-described specific section, and the processor 42 can generate section signals by dividing the sensor signal into sections corresponding to one rotation of the rotating body 2.

Note that the sensor signal may change from a negative value to a positive value other than when the piezoelectric element 31 moves away from the road surface after moving closest to the road surface. In this case, the processor 42 may specify the zero cross point by further using a condition that the change amount (change rate) per unit time of the sensor signal is larger than a predetermined value.

As yet another approach, as shown in FIG. 13, the processor 42 may select the section signal using an acceleration signal output from an acceleration sensor provided in the wheel 21. The acceleration sensor may be disposed at the center of the wheel 21, for example. Specifically, the processor 42 sets one cycle of the acceleration signal as a window, and selects a portion of the sensor signal included in the window as the section signal.

Since the direction of the gravitational acceleration detected by the acceleration sensor changes in accordance with the rotation of the rotating body 2, the acceleration signal has a periodic waveform. For example, when the rotation speed of the rotating body 2 is constant, the acceleration signal becomes a sine wave. In this case, one cycle of the acceleration signal corresponds to one rotation of the rotating body 2. As described above, according to the present approach, even when the rotation speed of the rotating body 2 changes, the sensor signal corresponding to one rotation of the rotating body 2 can be selected as the section signal. In this case, according to the present approach, a section corresponding to one rotation of the rotating body 2 can be selected as the above-described specific section, and the processor 42 can generate section signals by dividing the sensor signal into sections corresponding to one rotation of the rotating body 2.

The acceleration signal may include a noise component. Accordingly, the processor 42 may remove the noise component from the acceleration signal and practice the approach shown in FIG. 13 using the acceleration signal from which the noise component has been removed.

Subsequently, the processor 42 estimates the state of the rotating body 2 based on the section signal (step S3). As described above, the state of the rotating body 2 estimated by the processor 42 includes, for example, at least one of the camber angle, the slip angle, the load applied to the rotating body 2, and the air pressure. That is, the parameters representing the state of the rotating body 2 may include the camber angle, the slip angle, the load, and the air pressure. When each parameter changes, the waveform of the sensor signal changes. The influence of each parameter on the waveform of the sensor signal may be different from each other.

Figure 14:
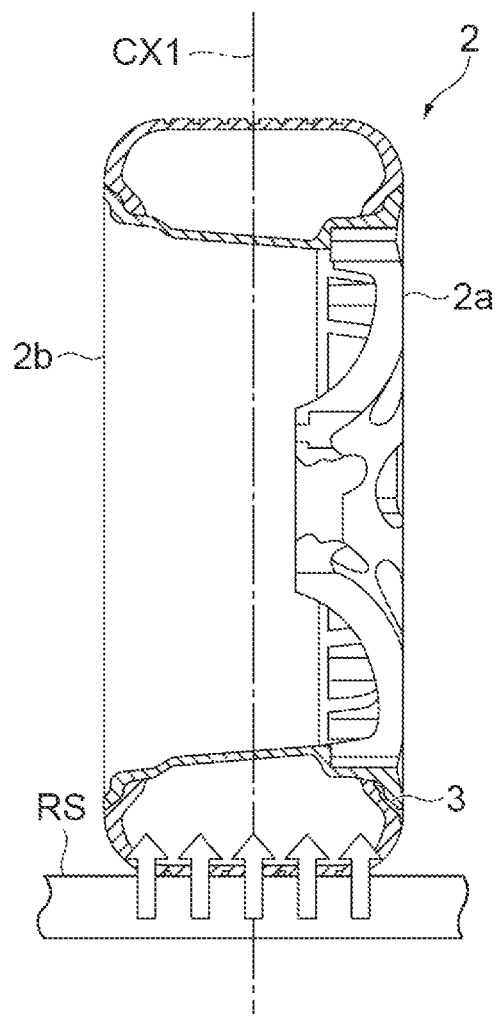
FIG. 14 is a diagram for explaining the reaction force from the road surface when the camber angle is 0 degrees.
Figure 15:
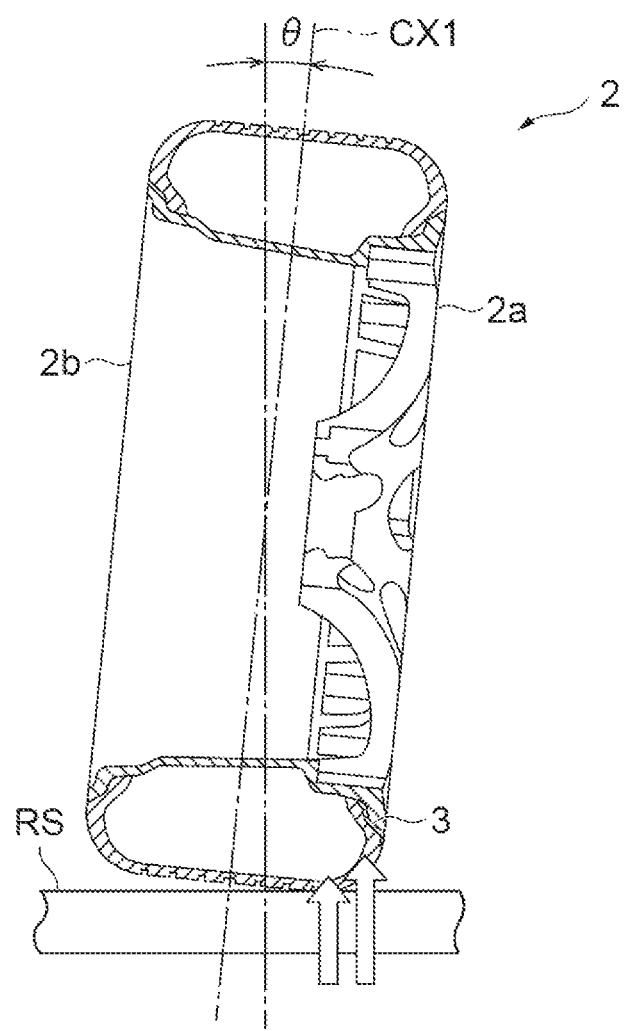
FIG. 15 is a diagram for explaining the reaction force from the road surface in the positive camber.
Figure 16:
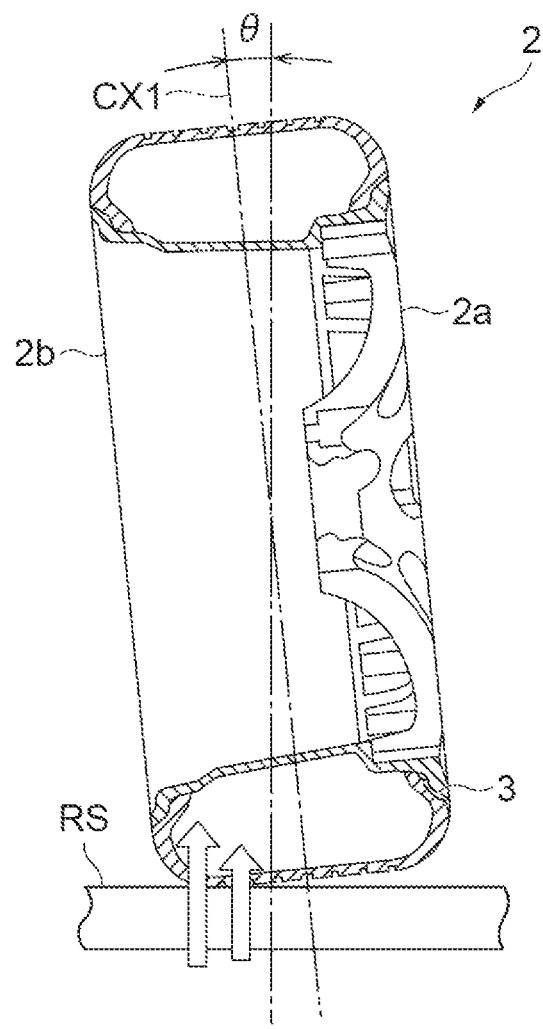
FIG. 16 is a diagram for explaining the reaction force from the road surface in the negative camber.
Figure 17:
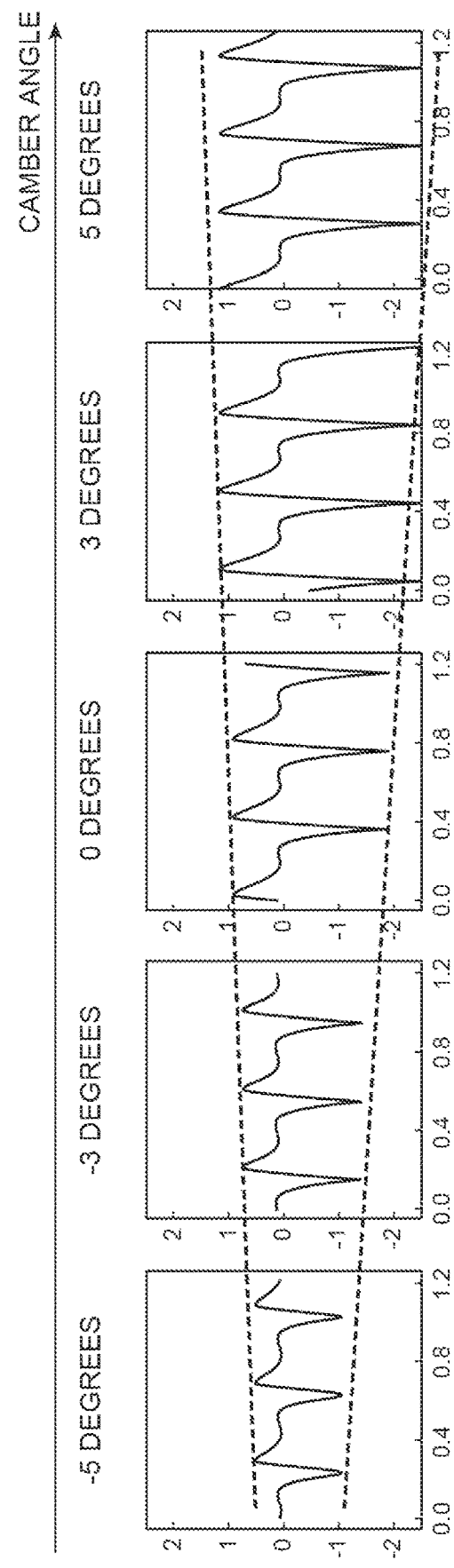
FIG. 17 is a diagram showing an example of a sensor signal for each camber angle.
Figure 18:
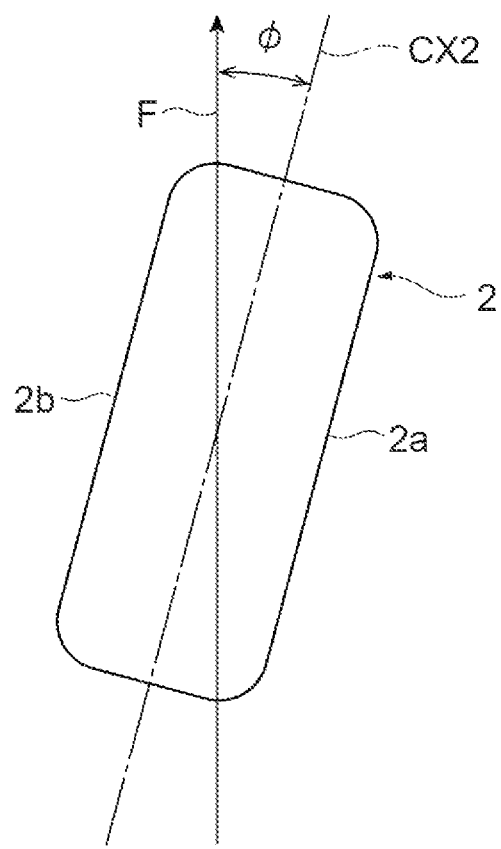
FIG. 18 is a diagram for explaining a slip angle.
Figure 19:
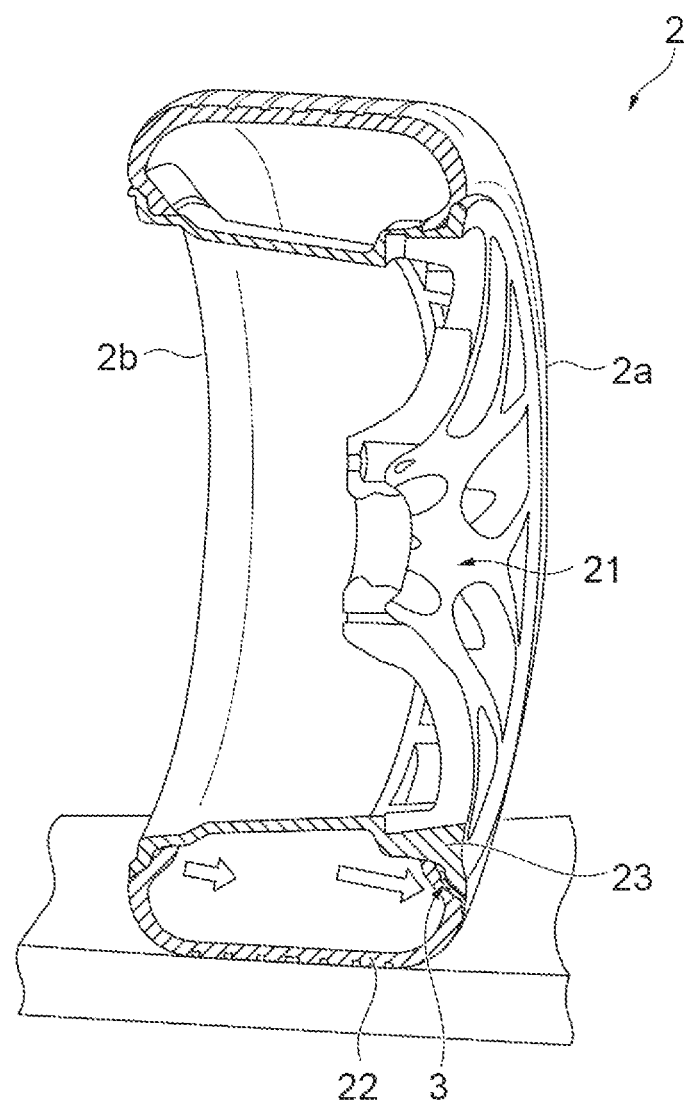
FIG. 19 is a diagram for explaining a force acting on a sensor module when a slip angle occurs.
Figure 20:
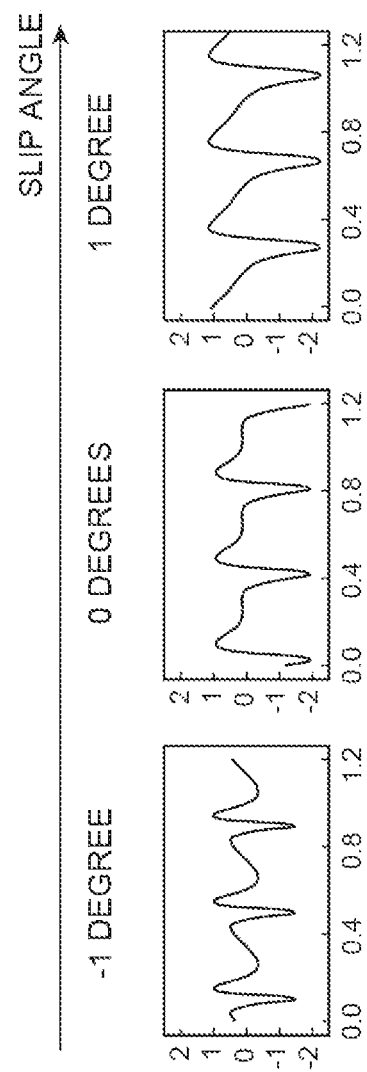
FIG. 20 is a diagram showing an example of a sensor signal for each slip angle.
Figure 21:
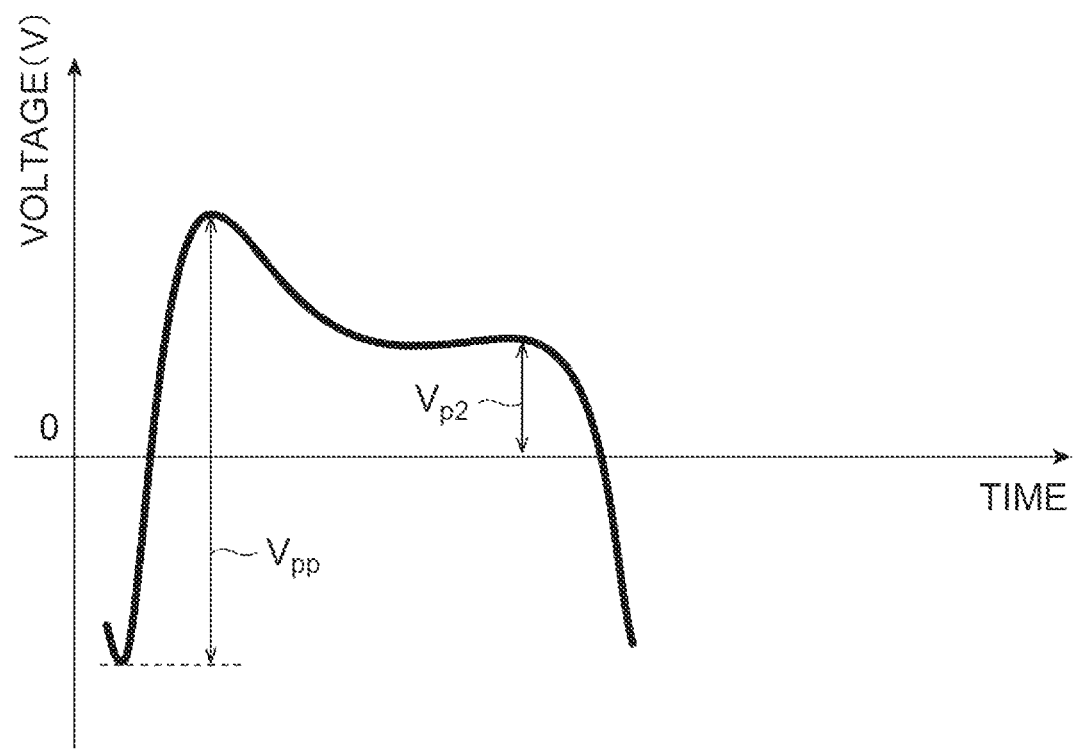
FIG. 21 is a diagram for explaining a peak-to-peak value and a second peak value.
Figure 22:
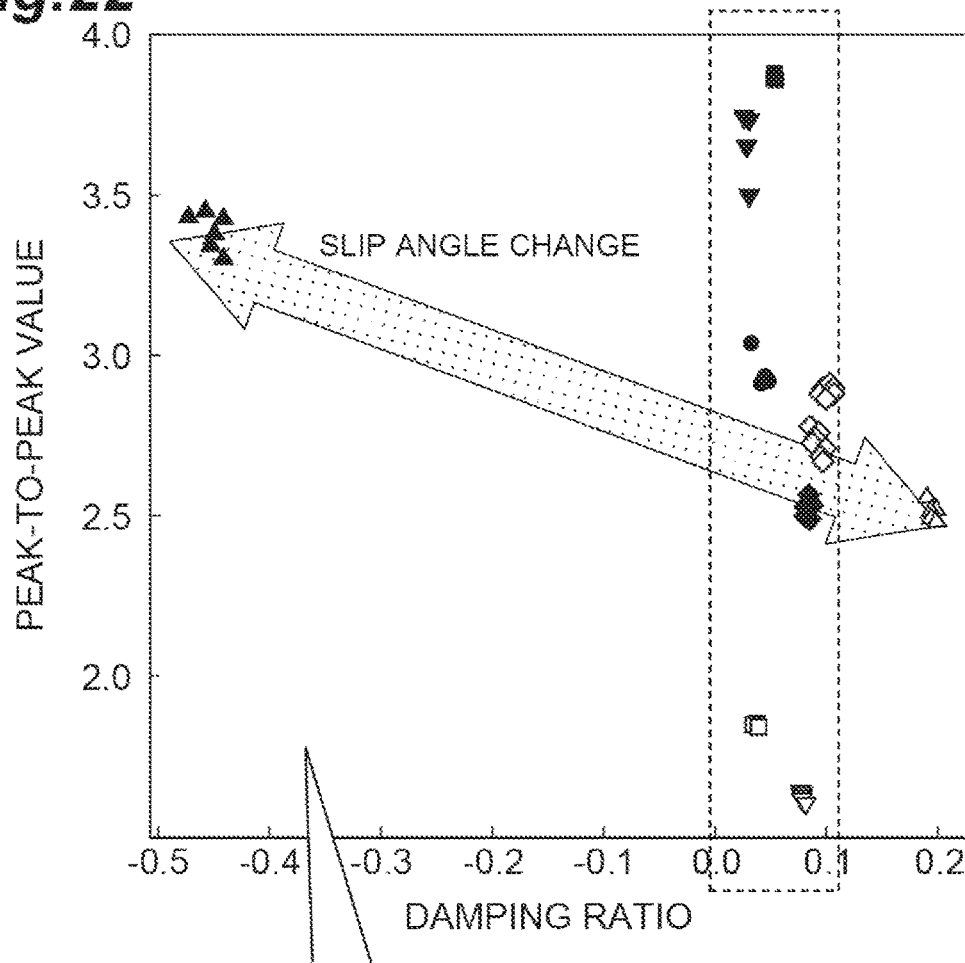
FIG. 22 is a diagram showing the relationship between a peak-to-peak value and a damping ratio when a slip angle, a camber angle, a load and air pressure are changed.
Figure 23:
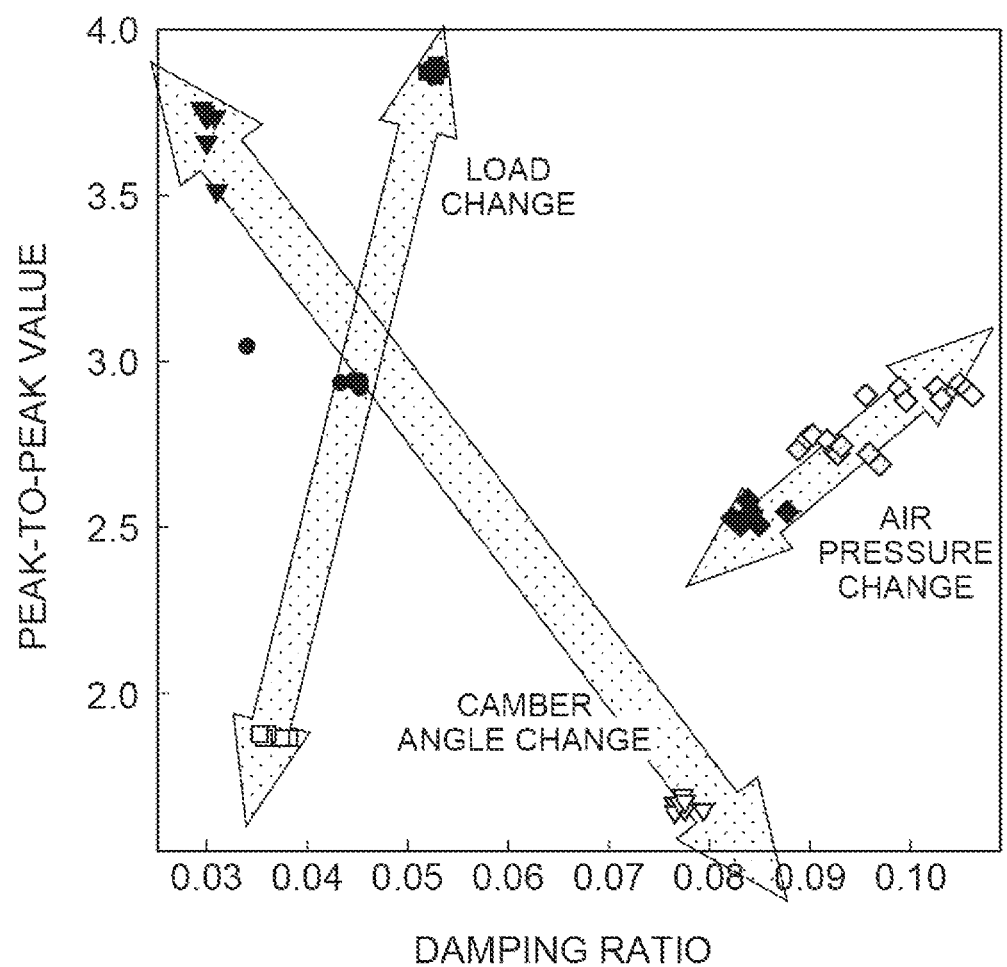
FIG. 23 is a partially enlarged view of FIG. 22.

Hereinafter, the influence of each parameter on the waveform of the sensor signal will be described with reference to FIGS. 14 to 23. FIG. 14 is a diagram for explaining the reaction force from the road surface when the camber angle is 0 degrees. FIG. 15 is a diagram for explaining the reaction force from the road surface in the positive camber. FIG. 16 is a diagram for explaining the reaction force from the road surface in the negative camber. FIG. 17 is a diagram showing an example of a sensor signal for each camber angle. FIG. 18 is a diagram for explaining a slip angle. FIG. 19 is a diagram for explaining a force acting on a sensor module when a slip angle occurs. FIG. 20 is a diagram showing an example of a sensor signal for each slip angle. FIG. 21 is a diagram for explaining a peak-to-peak value and a second peak value. FIG. 22 is a diagram showing the relationship between a peak-to-peak value and a damping ratio when a slip angle, a camber angle, a load and air pressure are changed. FIG. 23 is a partially enlarged view of FIG. 22.

As shown in FIGS. 14 to 16, when the camber angle θ changes, the reaction force received by the rotating body 2 from the road surface RS changes. The camber angle θ can be expressed as, for example, an inclination angle of the rotating body 2 when the vehicle V is viewed from the front. The camber angle θ may be expressed as an inclination of the rotating body 2 with respect to the road surface RS, for example. In the specific examples shown in FIGS. 14 to 16, the camber angle θ is expressed as an angle formed by the center axis CX1 of the rotating body 2 and the normal direction of the road surface RS. The center axis CX1 is a vertical axis of the rotating body 2. When the upper end of the rotating body 2 is inclined outward, the camber angle θ is a positive value. This state can be expressed as that the upper end of the rotating body 2 is inclined in the positive direction (positive camber). When the upper end of the rotating body 2 is inclined inward, the camber angle θ is a negative value. This state can be expressed as that the upper end of the rotating body 2 is inclined in the negative direction (negative camber). In the specific examples shown in FIGS. 14 to 16, the upper end of the rotating body 2 represents an end portion on the opposite side to the road surface RS.

As shown in FIG. 14, when the camber angle θ is 0 degrees, a uniform reaction force acts from the road surface RS on the portion of the rotating body 2 (tire 22) that is in contact with the road surface RS. As shown in FIG. 15, when the camber angle θ is positive, the reaction force from the road surface RS increases toward the outer end portion 2a of the rotating body 2. As shown in FIG. 16, when the camber angle θ is negative, the reaction force from the road surface RS increases toward the inner end portion 2b of the rotating body 2.

A case where the sensor module 3 is disposed in the outer end portion 2a (outer rim) will be described as an exemplary case of the present embodiment. In this case, as shown in FIG. 17, as the camber angle θ increases, the reaction force received by the piezoelectric element 31 from the road surface RS increases. Therefore, as the camber angle θ increases, the peak-to-peak value of the sensor signal increases. The peak-to-peak value may be expressed as an absolute value of a difference between a local minimum value in the negative direction and a local maximum value in the positive direction in FIG. 17, for example. Further, since the bead of the tire 22 approaches the flange of the rim 23 due to the reaction force received from the road surface RS, the piezoelectric element 31 is pressed against the bead of the tire 22 and the flange of the rim 23. Therefore, the degree of freedom of the piezoelectric element 31 is reduced. In the present embodiment, the degree of freedom of the piezoelectric element 31 may represent, for example, a degree to which the piezoelectric element 31 is deformable. Thus, as the camber angle θ increases, the vibration after the peak of the sensor signal tends to decrease.

On the other hand, as the camber angle θ decreases, the reaction force received by the piezoelectric element 31 from the road surface RS decreases. Thus, as the camber angle θ decreases, the peak-to-peak value of the sensor signal decreases. Furthermore, since the force with which the bead of the tire 22 and the flange of the rim 23 press the piezoelectric element 31 is weakened, the degree of freedom of the piezoelectric element 31 is increased. Thus, as the camber angle θ decreases, the vibration after the peak of the sensor signal tends to increase.

As shown in FIG. 18, the slip angle φ is an inclination angle of the rotating body 2 when the vehicle V is viewed from above (for example, when the vehicle V or the rotating body 2 present on the road surface is viewed downward). Specifically, the slip angle φ is an angle formed by the direction CX2 of the rotating body 2 and the traveling direction F of the vehicle V. The direction CX2 of the rotating body 2 may be, for example, orthogonal to the direction in which the rotational axis AX of the rotating body 2 extends and substantially parallel to the road surface. Hereinafter, for the sake of description, the slip angle φ when the front end of the rotating body 2 is inclined to the outside of the vehicle V with respect to the traveling direction F is expressed as a positive value. The slip angle φ when the front end of the rotating body 2 is inclined to the inside of the vehicle V with respect to the traveling direction F is expressed as a negative value. Note that FIG. 18 shows the rotating body 2 on the right side of the vehicle V. In the rotating body 2, a right direction with respect to the traveling direction F is the outside of the vehicle V, and a left direction with respect to the traveling direction F is the inside of the vehicle V. In the rotating body 2 on the left side of the vehicle V, the left direction with reference to the traveling direction F is the outside of the vehicle V, and the right direction with reference to the traveling direction F is the inside of the vehicle V.

As shown in FIG. 19, when the slip angle φ changes, the degree of freedom of the piezoelectric element 31 is changed. When the slip angle φ is a positive value, the force with which the bead of the tire 22 approaches the flange of the rim 23 increases toward the outer end portion 2a of the rotating body 2. In this case, for example, the pressing force by the tire 22 and the rim 23 in the outer end portion 2a (outer rim side) of the rotating body 2 is larger than the pressing force by the tire 22 and the rim 23 in the inner end portion 2b (inner rim side) of the rotating body 2. When the sensor module 3 is disposed in the outer end portion 2a (outer rim), the piezoelectric element 31 is pressed by the bead of the tire 22, and thus the degree of freedom of the piezoelectric element 31 is reduced. Therefore, as shown in FIG. 20 (particularly, when the slip angle is positive in FIG. 20), the vibration after the peak of the sensor signal is suppressed.

On the other hand, when the slip angle φ is a negative value, the bead of the tire 22 receives such a force as to be pulled away from the flange of the rim 23 toward the outer end portion 2a of the rotating body 2. In this case, for example, the pressing force by the tire 22 and the rim 23 in the outer end portion 2a (outer rim side) of the rotating body 2 is smaller than the pressing force by the tire 22 and the rim 23 in the inner end portion 2b (inner rim side) of the rotating body 2. Accordingly, since the force with which the bead of the tire 22 presses the piezoelectric element 31 is relaxed, the degree of freedom of the piezoelectric element 31 is increased. Therefore, as shown in FIG. 20, the vibration after the peak of the sensor signal becomes large.

Even if the slip angle φ changes, there is a case where the reaction force from the road surface acting on the piezoelectric element 31 does not change so much. On the other hand, as the slip angle φ increases, the force with which the bead of the tire 22 presses the piezoelectric element 31 may increase. Therefore, in some cases, when the slip angle φ increases, the peak-to-peak value of the sensor signal may slightly increase.

When the load changes, the force received by the piezoelectric element 31 from the vehicle body changes. Specifically, as the load increases, the force received by the rotating body 2 from the vehicle body increases. At this time, since the pressing force applied to the sensor module 3 becomes large, the peak-to-peak value of the sensor signal becomes large. On the other hand, as the load becomes smaller, the force received by the rotating body 2 from the vehicle body becomes smaller. At this time, since the pressing force applied to the sensor module 3 decreases, the peak-to-peak value of the sensor signal decreases. That is, since the voltage generated by the piezoelectric element 31 changes due to the change in the load, the waveform of the sensor signal expands and contracts in the vertical axis direction (voltage value).

As the air pressure changes, the elastic modulus of the tire 22 changes. Since the tire 22 is less likely to contract as the air pressure is higher, the reaction force acting on the piezoelectric element 31 from the road surface decreases. Thus, the peak-to-peak value of the sensor signal decreases. On the other hand, since the tire 22 is likely to contract as the air pressure is lower, the reaction force acting on the piezoelectric element 31 from the road surface increases. Thus, the peak-to-peak value of the sensor signal increases. That is, since the voltage generated by the piezoelectric element 31 changes depending on the change in the air pressure, the waveform of the sensor signal expands and contracts in the vertical axis direction.

The processor 42 estimates the state of the rotating body 2 based on the degree of influence of each parameter on the waveform of the sensor signal. Some examples of a process of estimating the state of the rotating body 2 will be described below, but the process of estimating the state of the rotating body 2 is not limited to these examples.

As one approach, the processor 42 may estimate the state of the rotating body 2 based on a plurality of different waveform characteristics calculated from the section signal. The plurality of waveform characteristics include a value based on at least one of a maximum value of the section signal, a minimum value of the section signal, a difference between the maximum value and the minimum value in the section signal (peak-to-peak value), a standard deviation of the section signal, a variance of the section signal, an average value of the section signal, a median value of the section signal, a value at an inflection point of the section signal, and a wavelength of the section signal. For example, as the plurality of waveform characteristics, one or more values among the values exemplified above may be used as they are, a combination of two or more values may be used, or a value calculated from these values by an appropriate calculation formula may be used.

For each parameter (camber angle, slip angle, load, and air pressure) representing the state of the rotating body 2, the relationship between the amount of change in the parameter and the amount of change in each waveform characteristic may be measured and stored in advance. Specifically, for each parameter representing the state of the rotating body 2, a relationship between an amount of change in the parameter and an amount of change in each waveform characteristic when only the parameter changes may be stored. Here, the number of waveform characteristics used in the process of estimating the state may be equal to or greater than the number of parameters to be estimated among the parameters representing the state of the rotating body 2.

As an example, changes in the peak-to-peak value and the damping ratio with respect to changes in each parameter will be described. The damping ratio is a damping ratio of the waveform of the sensor signal generated when the piezoelectric element 31 moves away from the road surface. The damping ratio is a value obtained by dividing the second peak value by the peak-to-peak value. As shown in FIG. 21, as the second peak value, for example, a peak value convex in the positive direction of the voltage occurring after the maximum value in the section signal may be used. When the section signal has no peak value convex in the positive direction other than the maximum value, for example, a value at an inflection point at which the change rate of the slope of the section signal changes from positive to negative after the maximum value may be used as the second peak value.

In the example shown in FIGS. 22 and 23, the state of the rotating body 2 when the camber angle is 0 degrees, the slip angle is 0 degrees, the load is 5300 N, and the air pressure is 240 kPa is used as the reference state. The reference state represents a state of the rotating body 2 at a certain speed, a certain camber angle, a certain slip angle, a certain load, and a certain air pressure. In the reference state, the peak-to-peak value is 2.9 V and the damping ratio is 0.042.

In the examples shown in FIGS. 22 and 23, as the camber angle increases, the peak-to-peak value increases and the damping ratio decreases. Specifically, when only the camber angle is changed from −5 degrees to +5 degrees from the reference state, the peak-to-peak value increases from 1.6 V to 3.7 V and the damping ratio decreases from 0.077 to 0.030. As the slip angle increases, the peak-to-peak value increases and the damping ratio decreases. Specifically, when only the slip angle is changed from −1 degree to +1 degree from the reference state, the peak-to-peak value increases from 2.6 V to 3.4 V, and the damping ratio decreases from 0.200 to −0.460.

In the examples shown in FIGS. 22 and 23, as the load increases, the peak-to-peak value increases and the damping ratio increases. Specifically, when only the load is changed from 3000 N to 7600 N from the reference state, the peak-to-peak value increases from 1.8 V to 3.8 V and the damping ratio increases from 0.037 to 0.052. As the air pressure increases, the peak-to-peak value decreases and the damping ratio decreases. Specifically, when only the air pressure is changed from 160 kPa to 260 kPa, the peak-to-peak value decreases from 2.9 V to 2.6 V and the damping ratio decreases from 0.100 to 0.083.

The processor 42 may estimate the state of the rotating body 2 by comparing the actual measurement value with the reference value. The reference value is a value of each waveform characteristic in the reference state of the rotating body 2. The actual measurement value is a value of each waveform characteristic obtained from the section signal. Specifically, when the actual measurement value is different from the reference value in any one of the waveform characteristics, the processor 42 determines that the state of the rotating body 2 has changed from the reference state. Then, the processor 42 may calculate the value of the parameter to be estimated based on the amount of change in each waveform characteristic. As an example of the state estimation, the processor 42 may estimate the state of the rotating body 2 using the relationship shown in FIGS. 22 and 23. In this case, for example, the processor 42 may set two parameters of the state of the rotating body 2 as estimation targets and calculate the values of the two parameters that are the estimation targets from the actual measurement values on the assumption that the parameters other than the estimation targets do not change.

The processor 42 may estimate which parameter has changed from the amount of change in each waveform characteristic (the value obtained by subtracting the reference value from the actual measurement value) on the assumption that any one of the plurality of parameters has changed.

As another approach, the processor 42 may determine the state of the rotating body 2 using a clustering method such as a k-means method. Specifically, the processor 42 classifies the section signal into one of the clusters set corresponding to each parameter of the rotating body 2 based on the actual measurement value of each waveform characteristic obtained from the section signal. The processor 42 estimates the state corresponding to the cluster into which the section signal is classified as the state of the rotating body 2.

Figure 24:
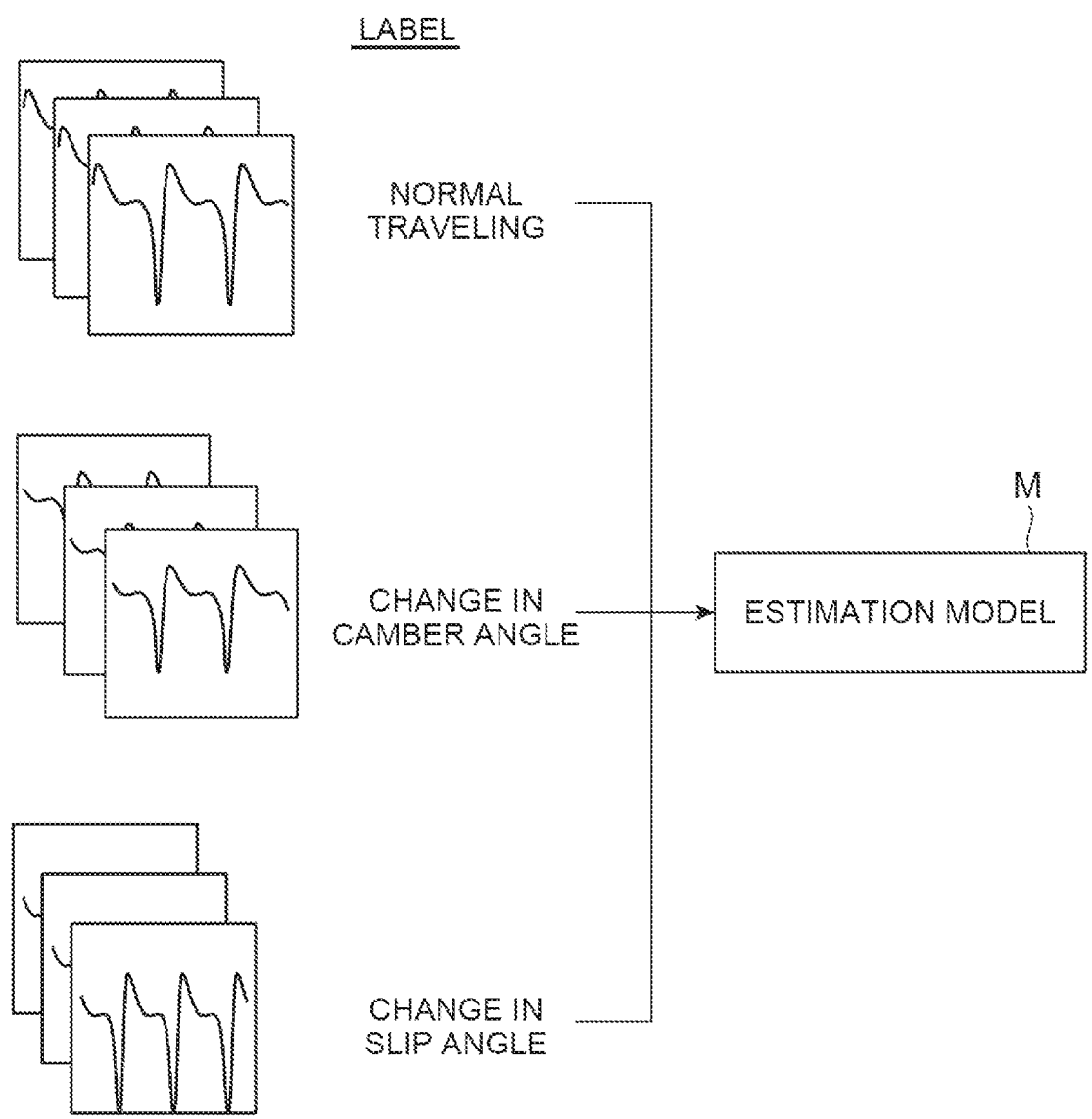
FIG. 24 is a diagram for explaining an estimation model.

As yet another approach, the processor 42 may estimate the state of the rotating body 2 using the estimation model M. The estimation model M may be, for example, a machine learning model learned to estimate the state of the rotating body 2. The estimation model M will be described with reference to FIG. 24. FIG. 24 is a diagram for explaining an estimation model. As shown in FIG. 24, the estimation model M may be generated by, for example, machine learning using learning data. As an algorithm of the machine learning, an algorithm such as random forest, LightGBM, or deep learning may be used. The estimation model M may be, for example, a classifier that classifies the state of the rotating body 2 into a specific category (for example, a range of camber angles, a range of slip angles, and a range of loads, etc.), or may be a regression model that outputs an estimated value of the state of the rotating body 2.

The learning data may include, for example, a feature vector calculated from a section signal generated from a sensor signal acquired in advance by the sensor module 3. The feature vector may include values of a plurality of waveform characteristics as elements. The feature vector may include, as elements, one or more of a maximum value of the section signal, a minimum value of the section signal, a peak-to-peak value of the section signal, a standard deviation of the section signal, a variance of the section signal, an average value of the section signal, a median value of the section signal, a value at an inflection point of the section signal (e.g., a second peak value), a wavelength of the section signal, and a value calculated from these values. The feature vector is not limited thereto, and may be, for example, all data itself (for example, a voltage value itself) included in the section signal. A label corresponding to the state of the rotating body 2 may be assigned to the learning data. Examples of labels may include normal travel, changes in camber angle, and changes in slip angle. An amount of change in the parameter may be used as the label. For example, a range of camber angles, a range of slip angles, a range of loads, a range of air pressure, and the like may be used as labels.

The estimation model M receives a feature vector calculated from the section signal as an input, and outputs an estimation result. The estimation result is information indicating the state of the rotating body 2. The estimation result may include information indicating which parameter has changed. The estimation result may include a change amount of each parameter. The estimation result may include a range of each parameter (for example, a range of camber angles, a range of slip angles, a range of loads, a range of air pressure, and the like).

In the example of FIG. 24, the estimation model M is configured to estimate all states with one model. The estimation model M is not limited thereto, and may include a plurality of estimation models provided for each parameter to be estimated (for example, camber angle, slip angle, load, air pressure, and the like). Each estimation model estimates the state assigned to that estimation model.

Subsequently, the processor 42 outputs the estimation result (step S4). In the present embodiment, the processor 42 may output the estimation result to the external device 5 via the communication interface 43, for example. Upon receiving the estimation result, the external device 5 may present the estimation result to the occupant using the output device 54, for example. For example, when the output device 54 is a display, the output device 54 displays the estimation result. The external device 5 is not limited thereto, and may provide the received estimation result to another device installed in the vehicle V, for example. For example, the external device 5 may provide the received estimation result to a device disposed outside the vehicle V (for example, a server or the like to which the external device 5 is connectable via the communication network NW2).

Thus, a series of processes of the estimation method ends.

In the estimation system 1, the estimation method, and the recording medium described above, the sensor signal in accordance with the pressing force by the wheel 21 and the tire 22 is output from the piezoelectric element 31 disposed between the wheel 21 and the tire 22. A weight W from the vehicle V (vehicle body) acts on the piezoelectric element 31 via the wheel 21, and a reaction force R from the road surface acts on the piezoelectric element 31 via the tire 22. Since these forces can change depending on the state of the rotating body 2, the state of the rotating body 2 can be estimated based on the sensor signal. Therefore, the state of the rotating body 2 can be estimated with a simple configuration in which the piezoelectric element 31 (sensor module 3) is disposed between the wheel 21 and the tire 22.

When the wheel 21 includes the rim 23, the tire 22 is mounted on the rim 23. In this case, the piezoelectric element 31 is disposed between the rim 23 and the tire 22. Therefore, the state of the rotating body 2 can be estimated with a simple configuration in which the piezoelectric element 31 (sensor module 3) is disposed between the rim 23 and the tire 22.

In a case where the piezoelectric element 31 is disposed at the center of the rotating body 2 in the direction in which the rotational axis AX extends, for example, the sensor signal changes in the same manner regardless of whether the camber angle changes in the positive direction or the negative direction. On the other hand, in the above-described embodiment, when the piezoelectric element 31 is disposed in the outer end portion 2a, the sensor signal changes asymmetrically with respect to a change in the camber angle or the like. Here, "the sensor signal changes asymmetrically" means that the sensor signal when the camber angle changes in the positive direction is different from the sensor signal when the camber angle changes in the negative direction. For example, when the camber angle increases in the positive direction, the reaction force from the road surface increases toward the outer end portion 2a of the rotating body 2, and thus the peak-to-peak value of the sensor signal increases. For example, when the camber angle decreases, the reaction force from the road surface increases toward the inner end portion 2b of the rotating body 2, and thus the peak-to-peak value of the sensor signal decreases. That is, by disposing the piezoelectric element 31 in the outer end portion 2a of the rotating body 2, it is possible to improve the estimation accuracy of the state of the rotating body 2.

On the other hand, even if the piezoelectric element 31 is disposed in the inner end portion 2b, the sensor signal changes asymmetrically with respect to a change in the camber angle or the like. In this case, the reaction force from the road surface in the inner end portion 2b of the rotating body 2 changes in accordance with the camber angle. Therefore, even in a configuration in which the piezoelectric element 31 is disposed in the inner end portion 2b, it is possible to improve the estimation accuracy of the state of the rotating body 2.

As described above, the section signal may be generated by, for example, dividing the sensor signal into sections corresponding to one rotation of the rotating body 2. When the rotating body 2 rotates, the portion of the rotating body 2 that comes into contact with the road surface changes, and thus the relative positional relationship between the piezoelectric element 31 and the contact portion changes. Therefore, in some situations, the sensor signal has a periodicity such that the waveform shape becomes similar every time the rotating body 2 makes one rotation. In this case, the state of the rotating body 2 can be estimated by analyzing the section signal corresponding to one rotation of the rotating body 2.

The waveform characteristic calculated from the section signal can be an index indicating the state of the rotating body 2. Therefore, it is possible to improve the estimation accuracy of the state of the rotating body 2 by using a plurality of waveform characteristics, which are different from each other, calculated from the section signal.

The maximum value of the section signal, the minimum value of the section signal, the peak-to-peak value of the section signal, the standard deviation of the section signal, the variance of the section signal, the average value of the section signal, the median value of the section signal, and the value at the inflection point of the section signal are values representing the waveform characteristics of the section signal. When the state of the rotating body 2 changes, these values may change. Therefore, it is possible to improve the estimation accuracy of the state of the rotating body 2 by using a value based on at least one of these values.

The processor 42 may estimate the state of the rotating body 2 using the estimation model M. In this case, it is possible to improve the estimation accuracy of the state of the rotating body 2 by sufficiently learning the estimation model M.

As described above, the tendency of change in the sensor signal when the camber angle changes, the tendency of change in the sensor signal when the slip angle changes, the tendency of change in the sensor signal when the load changes, and the tendency of change in the sensor signal when the air pressure changes may be different from each other. In this case, the camber angle, the slip angle, the load, and the air pressure can be estimated separately.

As described above, the piezoelectric element 31 generates electric energy in accordance with a pressing force. For example, the processor 42 may be configured to operate using electric energy generated by the piezoelectric element 31. According to this configuration, the processor 42 can operate without receiving electric power from the outside of the sensor module 3. Accordingly, wiring or the like for supplying electric power from the outside of the sensor module 3 becomes unnecessary, so that the configuration of the estimation system 1 can be simplified.

As described above, the piezoelectric element 31 and the processor 42 may constitute the sensor module 3. Such a sensor module 3 may be provided in the rotating body 2. The processor 42 may be configured to output the estimation result to the external device 5 provided outside the rotating body 2. In this configuration, the sensor signal is processed in the sensor module 3, and the estimation result is output to the external device 5. In this case, the amount of communication between the sensor module 3 and the external device 5 can be reduced compared with that of a configuration in which the sensor signal is processed in the external device 5. As a result, electric power required for communication can be reduced, so that electric energy generated by the piezoelectric element 31 can be effectively used.

Figure 25:
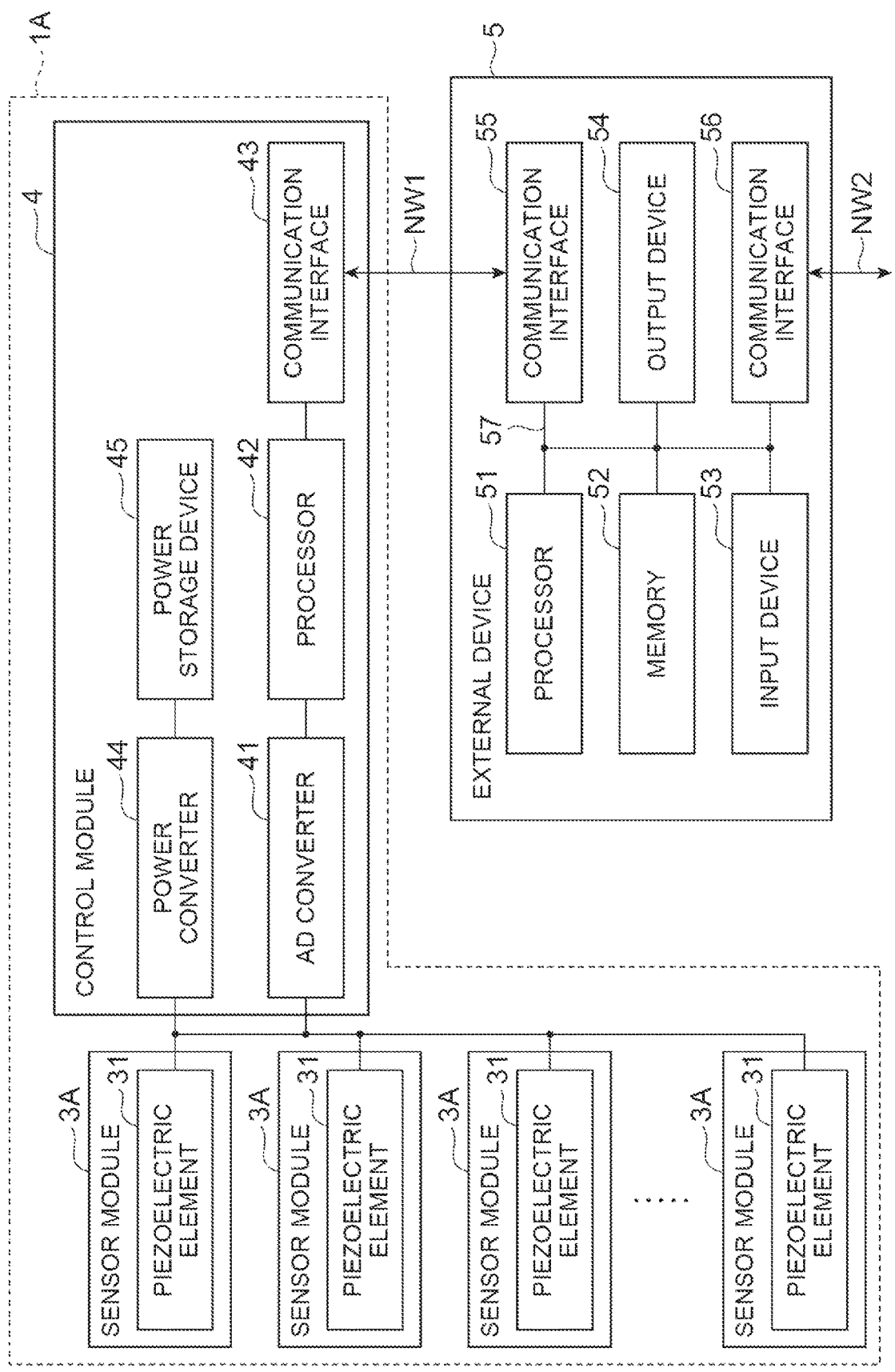
FIG. 25 is a configuration diagram schematically showing an estimation system according to another embodiment.

An estimation system according to another embodiment will be described with reference to FIG. 25. FIG. 25 is a configuration diagram schematically showing an estimation system according to another embodiment. An estimation system 1A shown in FIG. 25 is mainly different from the estimation system 1 in that the estimation system 1A includes a plurality of sensor modules 3A and one control module 4 instead of one sensor module 3.

Each sensor module 3A is mainly different from the sensor module 3 in that the sensor module 3A does not include the AD converters 41, the processor 42, the communication interface 43, the power converter 44, and the power storage device 45 as circuit elements.

Each sensor module 3A may, for example, be configured to have a physical structure similar to that of the sensor module 3 and may include the piezoelectric element 31, the back plate 32, the substrate 33, the substrate 34, and the base material 35. The plurality of sensor modules 3A may be provided in the same rotating body 2, for example. Each sensor module 3A is disposed between the wheel 21 (rim 23) and the tire 22. Specifically, each sensor module 3A is disposed between the flange of the rim 23 and the bead of the tire 22 and is in contact with the flange of the rim 23 and the bead of the tire 22.

In the present embodiment, some sensor modules 3A are disposed in the outer end portion 2a (outer rim) and some sensor modules 3A are disposed in the inner end portion 2b (inner rim). The number of sensor modules 3A disposed in the outer end portion 2a may be the same as or different from the number of sensor modules 3A disposed in the inner end portion 2b. All of the sensor modules 3A may be disposed in only one of the outer end portion 2a and the inner end portion 2b.

The control module 4 is a module that processes sensor signals output from the plurality of sensor modules 3A provided in one rotating body 2. The control module 4 may be provided at the center of the wheel 21, for example. In the specific example shown in FIG. 25, the control module 4 includes an AD converter 41, a processor 42, a communication interface 43, a power converter 44, and a power storage device 45. The AD converter 41 and the communication interface 43 may be integrated into the processor 42. The AD converter 41, the processor 42, the communication interface 43, the power converter 44, and the power storage device 45 is different from the AD converter 41, the processor 42, the communication interface 43, the power converter 44, and the power storage device 45 of the sensor module 3 in that signals to be processed are a plurality of sensor signals.

Figure 26:
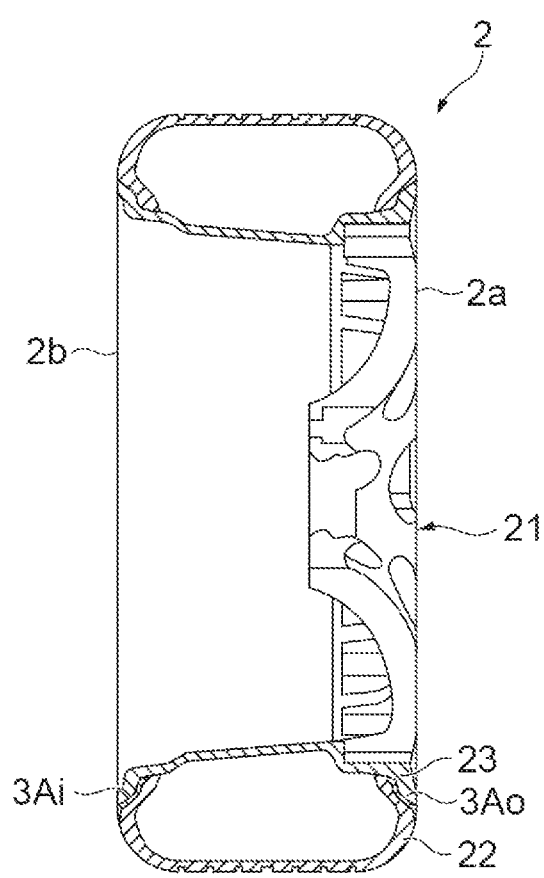
FIG. 26 is a diagram showing an example of the arrangement of sensor modules.
Figure 27:
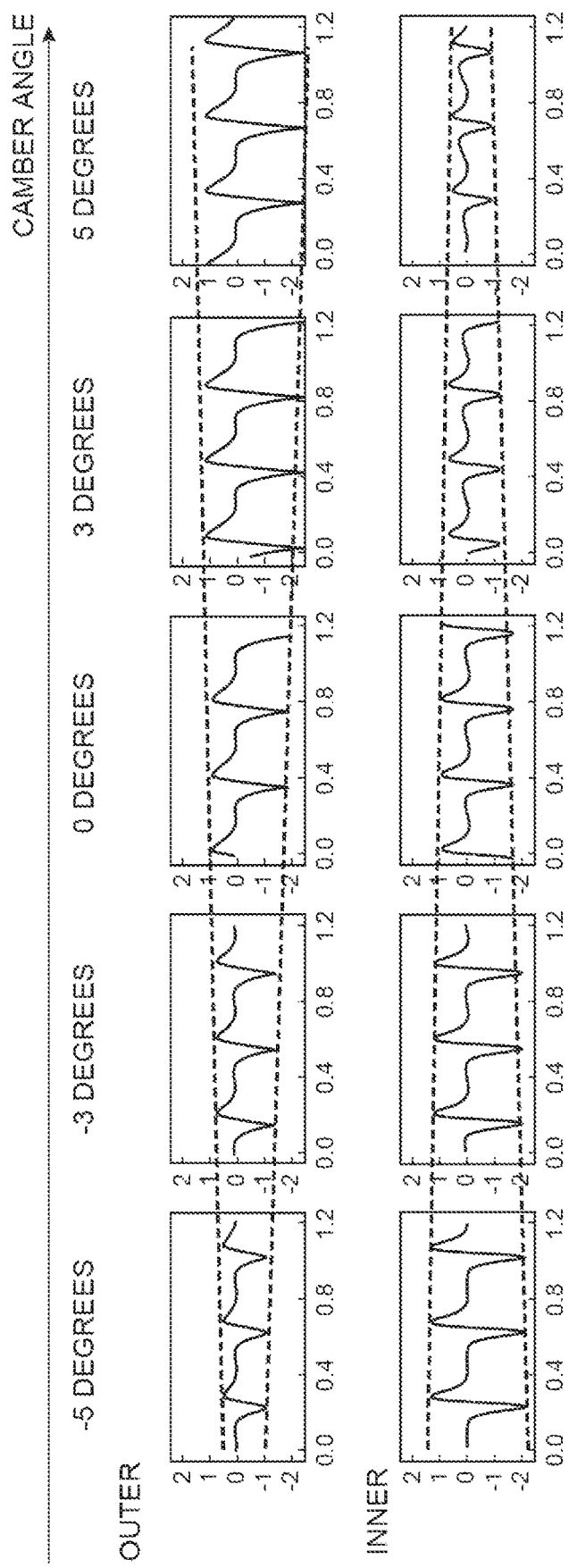
FIG. 27 is a diagram showing an example of a sensor signal for each camber angle.
Figure 28:
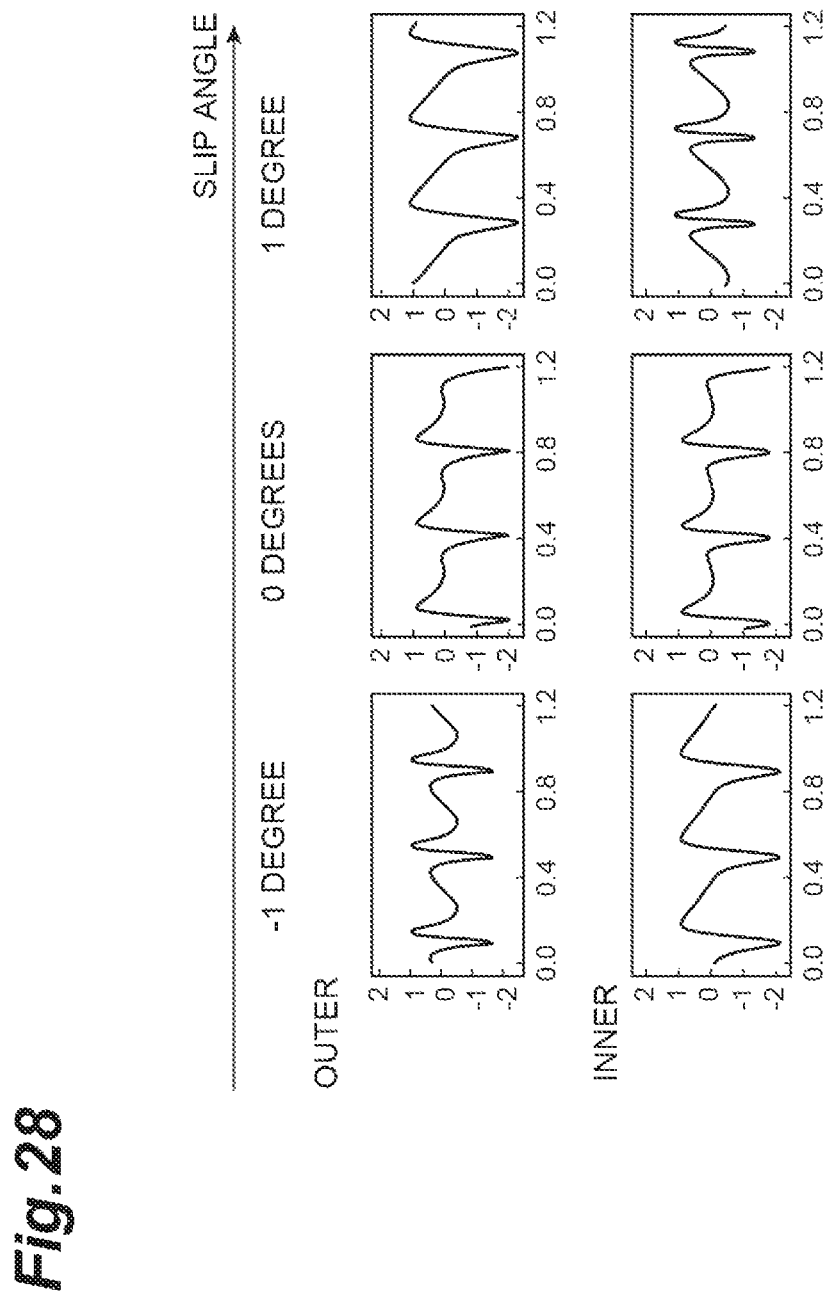
FIG. 28 is a diagram showing an example of a sensor signal for each slip angle.

Next, an arrangement example of the plurality of sensor modules 3A will be described with reference to FIGS. 26 to 28. FIG. 26 is a diagram showing an example of the arrangement of sensor modules. FIG. 27 is a diagram showing an example of a sensor signal for each camber angle. FIG. 28 is a diagram showing an example of a sensor signal for each slip angle. In the example shown in FIG. 26, one sensor module 3A is disposed in the outer end portion 2a (outer rim), and one sensor module 3A is disposed in the inner end portion 2b (inner rim). The sensor module 3A disposed in the outer end portion 2a is referred to as "sensor module 3Ao", and the sensor module 3A disposed in the inner end portion 2b is referred to as "sensor module 3Ai".

Specifically, the sensor module 3Ao is disposed between the wheel 21 (rim 23) and the tire 22 in the outer end portion 2a. More specifically, the sensor module 3Ao is disposed between an outer flange of the rim 23 and a bead of the tire 22 and is in contact with the outer flange of the rim 23 and the bead of the tire 22. The sensor module 3Ai is disposed between the wheel 21 (rim 23) and the tire 22 in the inner end portion 2b. More specifically, the sensor module 3Ai is disposed between an inner flange of the rim 23 and a bead of the tire 22 and is in contact with the inner flange of the rim 23 and the bead of the tire 22.

As the camber angle $\theta$ increases, the reaction force received by the piezoelectric element 31 of the sensor module 3Ao from the road surface increases. Thus, as shown in FIG. 27, as the camber angle $\theta$ increases, the peak-to-peak value of the sensor signal (hereinafter referred to as a "first sensor signal" in some cases) output from the piezoelectric element 31 of the sensor module 3Ao increases. Further, since the bead of the tire 22 approaches the outer flange of the rim 23 due to the reaction force received from the road surface, the piezoelectric element 31 of the sensor module 3Ao is pressed against the bead of the tire 22 and the outer flange of the rim 23. Therefore, the degree of freedom of the piezoelectric element 31 of the sensor module 3Ao is reduced. Therefore, as the camber angle $\theta$ increases, the vibration after the peak of the first sensor signal is suppressed.

As the camber angle $\theta$ decreases, the reaction force received by the piezoelectric element 31 of the sensor module 3Ao from the road surface decreases. Therefore, as the camber angle $\theta$ decreases, the peak-to-peak value of the first sensor signal decreases. Further, since the force with which the bead of the tire 22 and the outer flange of the rim 23 press the piezoelectric element 31 of the sensor module 3Ao is weakened, the degree of freedom of the piezoelectric element 31 of the sensor module 3Ao is increased. Therefore, as the camber angle $\theta$ decreases, the vibration after the peak of the first sensor signal increases.

On the other hand, as the camber angle $\theta$ increases, the reaction force received by the piezoelectric element 31 of the sensor module 3Ai from the road surface decreases. Therefore, as the camber angle $\theta$ increases, the peak-to-peak value of the sensor signal (hereinafter, referred to as a "second sensor signal" in some cases) output from the piezoelectric element 31 of the sensor module 3Ai decreases. Further, since the force with which the bead of the tire 22 and the inner flange of the rim 23 press the piezoelectric element 31 of the sensor module 3Ai is weakened, the degree of freedom of the piezoelectric element 31 of the sensor module 3Ai is increased. Therefore, as the camber angle $\theta$ increases, the vibration after the peak of the second sensor signal increases.

As the camber angle $\theta$ decreases, the reaction force received by the piezoelectric element 31 of the sensor module 3Ai from the road surface increases. Therefore, as the camber angle $\theta$ decreases, the peak-to-peak value of the second sensor signal increases. Further, since the bead of the tire 22 approaches the inner flange of the rim 23 due to the reaction force received from the road surface, the piezoelectric element 31 of the sensor module 3Ai is pressed against the bead of the tire 22 and the inner flange of the rim 23. Therefore, the degree of freedom of the piezoelectric element 31 of the sensor module 3Ai is reduced. Therefore, as the camber angle $\theta$ decreases, the vibration after the peak of the second sensor signal is suppressed.

As the slip angle $\varphi$ increases, the bead of the tire 22 approaches the outer flange of the rim 23, so that the piezoelectric element 31 of the sensor module 3Ao is pressed against the bead of the tire 22. Therefore, the degree of freedom of the piezoelectric element 31 of the sensor module 3Ao is reduced. Therefore, as shown in FIG. 28, as the slip angle $\varphi$ increases, the vibration after the peak of the first sensor signal is suppressed. As the slip angle $\varphi$ decreases, the force with which the bead of the tire 22 and the outer flange of the rim 23 press the piezoelectric element 31 of the sensor module 3Ao is weakened, and thus the degree of freedom of the piezoelectric element 31 of the sensor module 3Ao is increased. Therefore, as shown in FIG. 28, as the slip angle $\varphi$ decreases, the vibration after the peak of the first sensor signal increases.

On the other hand, as the slip angle $\varphi$ increases, the force with which the bead of the tire 22 and the inner flange of the rim 23 press the piezoelectric element 31 of the sensor module 3Ai is weakened, and thus the degree of freedom of the piezoelectric element 31 of the sensor module 3Ai is increased. Therefore, as shown in FIG. 28, as the slip angle φ increases, the vibration after the peak of the second sensor signal increases. As the slip angle φ decreases, the bead of the tire 22 approaches the inner flange of the rim 23, so that the piezoelectric element 31 of the sensor module 3Ai is pressed against the bead of the tire 22. Therefore, the degree of freedom of the piezoelectric element 31 of the sensor module 3Ai is reduced. Therefore, as shown in FIG. 28, as the slip angle φ decreases, the vibration after the peak of the second sensor signal is suppressed.

As shown in FIG. 28, when the AD converter 41 receives the first sensor signal and the second sensor signal, the AD converter 41 may convert the first sensor signal and the second sensor signal into digital signals and output the first sensor signal and the second sensor signal, which have been converted into digital signals, to the processor 42. When the processor 42 acquires the first sensor signal, which has been converted into a digital signal, from the AD converter 41, the processor 42 may generate the first section signal by dividing the first sensor signal by the specific section. When the processor 42 acquires the second sensor signal, which has been converted into a digital signal, from the AD converter 41, the processor 42 may generate the second section signal by dividing the second sensor signal by the specific section.

The process of generating the first section signal and the second section signal may be similar to the process of generating the section signal in the estimation system 1, for example. The processor 42 may estimate the state of the rotating body 2 based on the first section signal and the second section signal. The process of estimating the state of the rotating body 2 may be similar to the process of estimating the state of the rotating body 2 in the estimation system 1. The processor 42 may output the estimation result.

Also in the estimation system 1A, the same effects as those of the estimation system 1 are obtained in the configuration common to the estimation system 1. In the estimation system 1A, the piezoelectric element 31 of the sensor module 3Ao and the piezoelectric element 31 of the sensor module 3Ai are disposed opposite to each other with respect to the center of the rotating body 2 in the direction in which the rotational axis AX extends. For example, the piezoelectric element 31 of the sensor module 3Ao may be disposed in the outer end side with respect to the center of the rotating body 2 in the direction in which the rotational axis AX extends. For example, the piezoelectric element 31 of the sensor module 3Ai may be disposed in the inner end side with respect to the center of the rotating body 2 in the direction in which the rotational axis AX extends.

The sensor signal output from the piezoelectric element 31 of the sensor module 3Ao and the sensor signal output from the piezoelectric element 31 of the sensor module 3Ai change differently from each other in accordance with a change in the state of the rotating body 2. Specifically, as shown in FIGS. 27 and 28, the change in the sensor signal output from the piezoelectric element 31 of the sensor module 3Ao may be opposite to the change in the sensor signal output from the piezoelectric element 31 of the sensor module 3Ai. In a case where the state of the rotating body 2 is estimated using two sensor signals in which opposite changes occur as described above, an influence due to disturbance or the like can be reduced. As a result, the estimation accuracy of the state of the rotating body 2 may be improved compared with that of a configuration (estimation system 1) in which the state of the rotating body 2 is estimated using one sensor signal.

Figure 29:
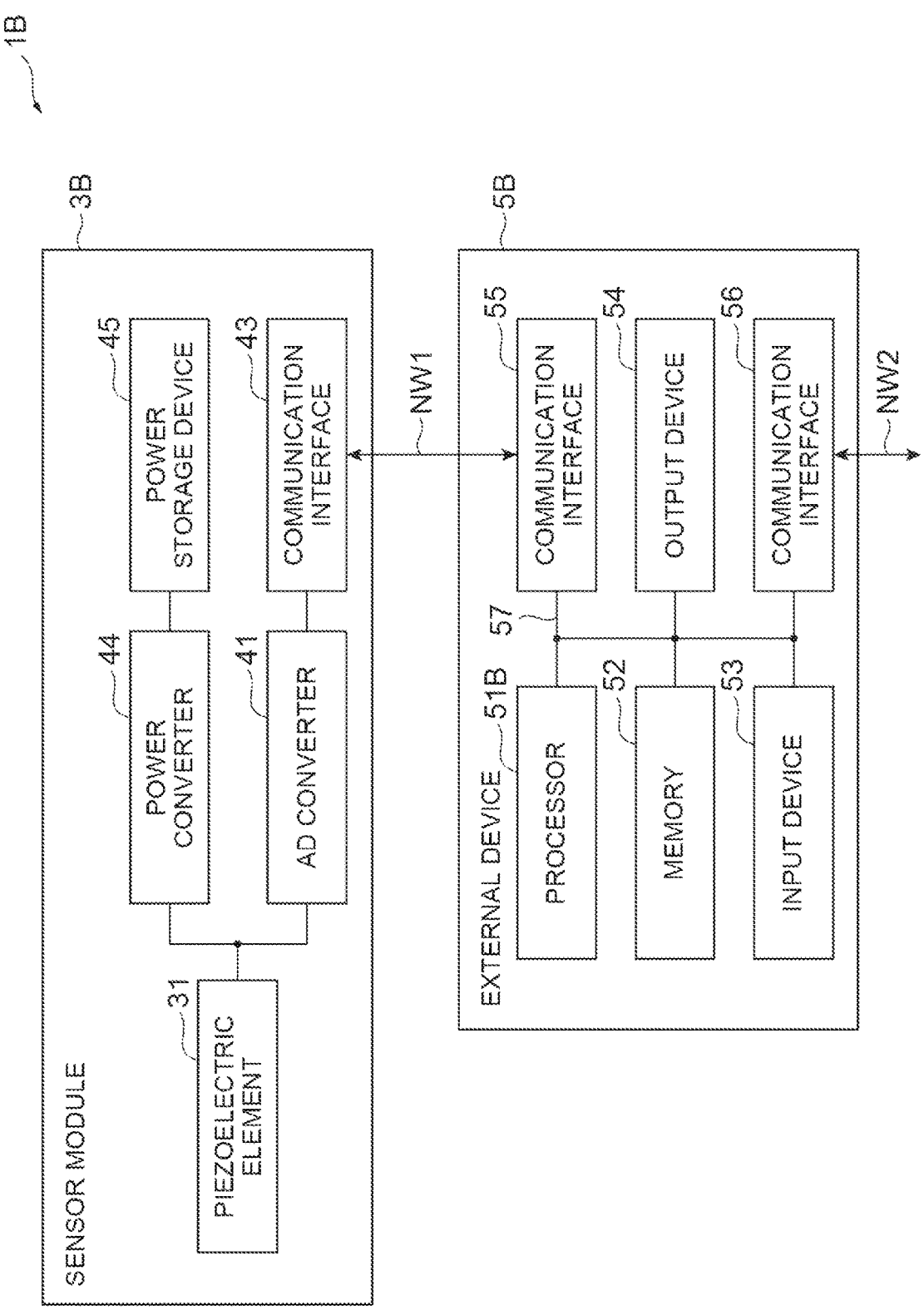
FIG. 29 is a configuration diagram schematically showing an estimation system according to yet another embodiment.

An estimation system according to yet another embodiment will be described with reference to FIG. 29. FIG. 29 is a configuration diagram schematically showing an estimation system according to yet another embodiment. An estimation system 1B shown in FIG. 29 is mainly different from the estimation system 1 in that the estimation system 1B includes a sensor module 3B instead of the sensor module 3 and further includes an external device 5B.

The sensor module 3B is mainly different from the sensor module 3 in that the sensor module 3B does not include the processor 42. In the sensor module 3B, the AD converter 41 outputs a sensor signal that is a digital signal to the communication interface 43. The communication interface 43 transmits the sensor signal that is a digital signal to the external device 5B via the communication network NW1.

The external device 5B is mainly different from the external device 5 in that the external device 5B includes a processor 51B instead of the processor 51. The processor 51B is mainly different from the processor 51 in that the processor 51B estimates the state of the rotating body 2 based on the sensor signal transmitted from the sensor module 3B. The processor 51B may be configured to estimate the state of the rotating body 2, for example, in the same manner as the processor 42. The processor 51B may output the estimation result to the output device 54, for example.

Also in the estimation system 1B, the same effects as those of the estimation system 1 are obtained in the configuration common to the estimation system 1. Further, in the estimation system 1B, the processor 51B of the external device 5B estimates the state of the rotating body 2. In this case, for example, since constraints such as electric power consumption, physical size, and cooling are relaxed, a processor having a higher calculation capability than the processor 42 included in the sensor module 3 can be adopted as the processor 51B. When such a processor 51B is adopted, it is possible to shorten the time required for estimating the state of the rotating body 2.

Figure 30:
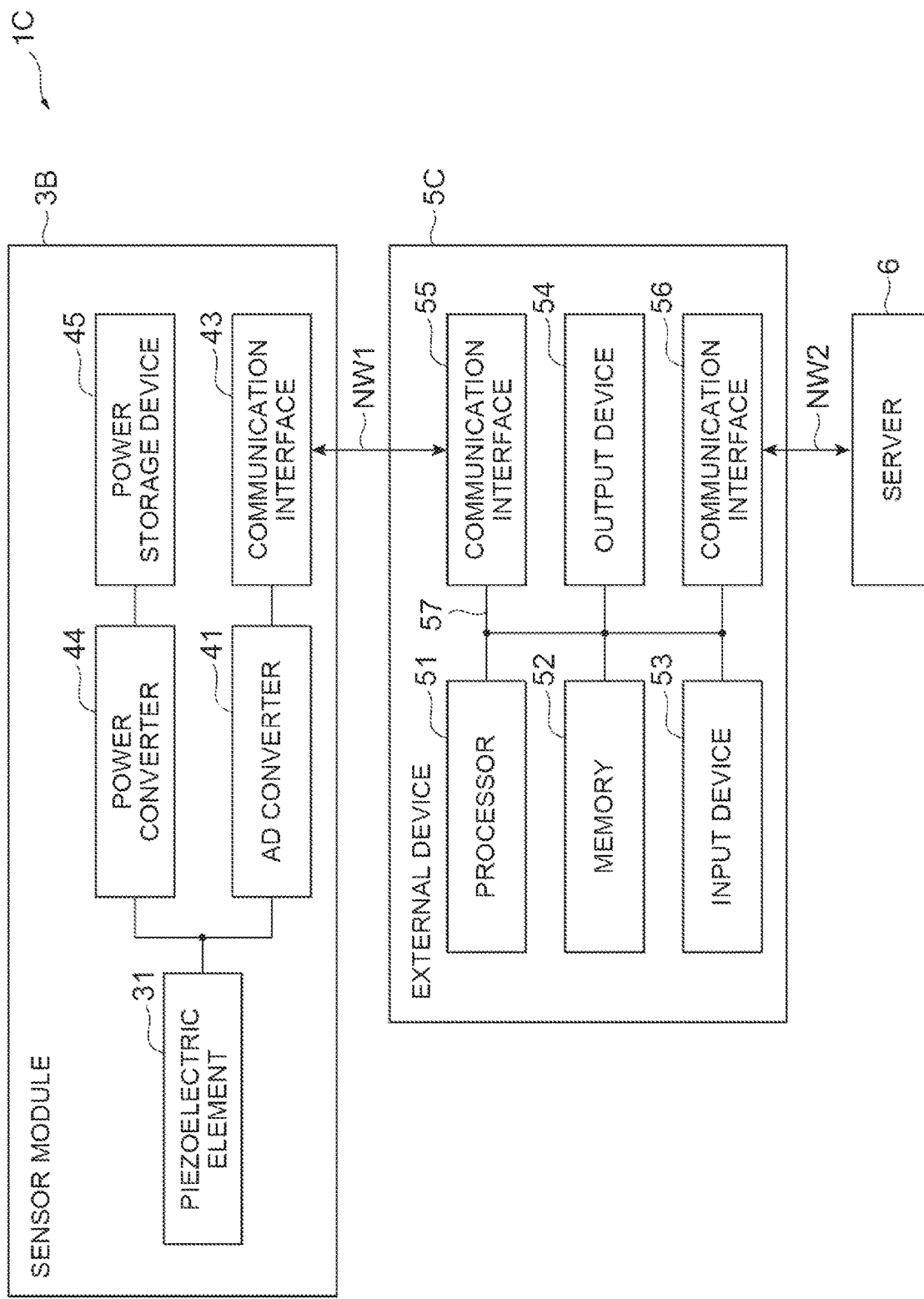
FIG. 30 is a configuration diagram schematically showing an estimation system according to yet another embodiment.

An estimation system according to yet another embodiment will be described with reference to FIG. 30. FIG. 30 is a configuration diagram schematically showing an estimation system according to yet another embodiment. An estimation system 1C shown in FIG. 30 is mainly different from the estimation system 1B in that the estimation system 1C includes an external device 5C instead of the external device 5B and further includes a server 6.

The external device 5C is mainly different from the external device 5B in that the external device 5C includes a processor 51 instead of the processor 51B. Like the processor 51 of the external device 5, the processor 51 is a circuit element that performs control and calculation in the external device 5C. Upon receiving the sensor signal from the sensor module 3B, the communication interface 55 outputs the sensor signal to the communication interface 56. The communication interface 56 may be configured to transmit the sensor signal to the server 6 via the communication network NW2.

The servers 6 may have, for example, a hardware configuration similar to that of the external device 5C. The processor of the sever 6 may estimate the state of the rotating body 2 based on the sensor signal transmitted from the external device 5C. In this case, the processor of the server 6 may estimate the rotating body 2 by, for example, processing similar to that of the processor 42.

Also in the estimation system 1C, the same effects as those of the estimation system 1B are obtained in the configuration common to the estimation system 1B. Further, in the estimation system 1C, the processor of the sever 6 estimates the state of the rotating body 2. According to this configuration, for example, even in a case where the sensor module 3B is installed in the rotating bodies 2 of a plurality of different vehicles V, it is not necessary to implement the function of estimating the state of the rotating body 2 in the external device 5 in each of the vehicles V. That is, the server 6 can estimate the state of the rotating body 2 provided in each vehicle V based on the signal collected via the external device 5 provided in each vehicle V.

The estimation system, the estimation method, and the recording medium according to the present disclosure are not limited to the above-described embodiments.

For example, each of the sensor modules 3 and 3B, and the control module 4 do not have to include the power converter 44 and the power storage device 45. In this case, each of the sensor modules 3 and 3B, and the control module 4 may include a battery or may receive electric power from the outside.

In the above-described embodiments, (the piezoelectric element 31 of) each of the sensor modules 3, 3A, and 3B is disposed in the outer end portion 2*a* or the inner end portion 2*b*, but may be disposed at a position depending on the configuration of the wheel 21 and the tire 22. (The piezoelectric element 31 of) each of the sensor modules 3, 3A, and 3B may be disposed at a position closer to the outer end or the inner end than the center of the rotating body 2 in the direction in which the rotational axis AX extends. In the example shown in FIG. 26, the piezoelectric element 31 of the sensor module 3Ao may be disposed at a position closer to the outer end than the center, and the piezoelectric element 31 of the sensor module 3Ai may be disposed at a position closer to the inner end than the center.

Any reference to an element using the designations such as "first" and "second", as used in the present disclosure does not limit the amount or order of the element. Such designations may be used in the present disclosure as a convenient way to distinguish between two or more elements. Thus, references to the first and second elements do not imply that only two elements may be adopted, or that the first element must precede the second element in any way. In the present disclosure, the use of a first element does not imply the assumption of the presence of two or more elements.

What is claimed is:

1. An estimation system comprising:
    a first sensor configured to be disposed between a wheel and a tire mounted on the wheel and to output a first sensor signal in accordance with a pressing force applied by the wheel and the tire; and
    a processor configured to;
        generate a first section signal by dividing the first sensor signal by a specific section;
        determine a damping ratio from the first section signal; and
        estimate a state of a rotating body including the wheel and the tire based on the damping ratio.

2. The estimation system according to claim 1, wherein the first sensor is disposed between a rim included in the wheel and the tire.

3. The estimation system according to claim 1, wherein the rotating body includes a first end and a second end that are both ends in a rotational axis direction of the rotating body, and wherein the first sensor is disposed at a position closer to the first end than a center of the rotating body in the rotational axis direction.

4. The estimation system according to claim 3, further comprising a second sensor configured to be disposed between the wheel and the tire and to output a second sensor signal in accordance with a second pressing force applied by the wheel and the tire,
    wherein the second sensor is disposed at a second position closer to the second end than the center, and
    wherein the processor generates a second section signal by dividing the second sensor signal by the specific section and estimates the state further based on the second section signal.

5. The estimation system according to claim 4, wherein the processor is configured to estimate the state of the rotating body based on a change in the first section signal being contrary to a corresponding change in the second section signal.

6. The estimation system according to claim 1, wherein the specific section is a section corresponding to one rotation of the rotating body.

7. The estimation system according to claim 1, wherein the processor estimates the state based on a plurality of waveform characteristics, which are different from each other, calculated from the first section signal.

8. The estimation system according to claim 7, wherein the plurality of waveform characteristics include a value based on at least one of a maximum value of the first section signal, a minimum value of the first section signal, a difference between the maximum value and the minimum value, a standard deviation of the first section signal, a variance of the first section signal, an average value of the first section signal, a median value of the first section signal, and a value at an inflection point of the first section signal.

9. The estimation system according to claim 1, wherein the processor estimates the state by using a machine learning model for estimating the state.

10. The estimation system according to claim 1, wherein the state includes at least one of a camber angle, a slip angle, a load applied to the rotating body, and air pressure.

11. The estimation system according to claim 1, wherein the first sensor and the processor constitute a sensor module, wherein the sensor module is provided in the rotating body, and wherein the processor outputs an estimation result to an external device provided outside the rotating body.

12. The estimation system according to claim 1, wherein the first sensor is a piezoelectric element that generates electric energy in accordance with the pressing force, and wherein the processor operates using the electric energy generated by the piezoelectric element.

13. The estimation system according to claim 1, wherein the first sensor is a piezoelectric element that generates electric energy in accordance with the pressing force, and wherein the processor estimates the state of the rotating body by using a voltage or an electric current of the electric energy generated by the piezoelectric element as the first sensor signal.

14. The estimation system according to claim 1, wherein the processor is further configured to determine a peak-to-peak value from the first section signal, and wherein the state of the rotating body is estimated based on the damping ratio and the peak-to-peak value.

15. The estimation system according to claim 14, wherein the damping ratio is determined by dividing a peak in the first section signal by the peak-to-peak value.

16. The estimation system according to claim 14, wherein the processor is configured to estimate the state of the rotating body by comparing the damping ratio and the peak-to-peak value to a reference state.

17. The estimation system according to claim 1, wherein the processor uses a clustering method to estimate the state of the rotating body.

18. The estimation system according to claim 1, wherein the processor uses an estimation model to estimate the state of the rotating body.

19. An estimation method comprising:
acquiring a sensor signal in accordance with a pressing force applied by a wheel and a tire mounted on the wheel from a sensor disposed between the wheel and the tire;
generating a section signal by dividing the sensor signal by a specific section;
determining a damping ratio from the section signal; and
estimating a state of a rotating body including the wheel and the tire based on the damping ratio.

20. A non-transitory computer-readable recording medium recording an estimation program, the estimation program configured to cause a computer to execute:
acquiring a sensor signal in accordance with a pressing force applied by a wheel and a tire mounted on the wheel from a sensor disposed between the wheel and the tire;
generating a section signal by dividing the sensor signal by a specific section;
determining a damping ratio from the section signal; and
estimating a state of a rotating body including the wheel and the tire based on the damping ratio.

* * * * *